US011501358B2

(12) United States Patent
Maldonado et al.

(10) Patent No.: US 11,501,358 B2
(45) Date of Patent: *Nov. 15, 2022

(54) SYSTEMS AND COMPUTER PROGRAM PRODUCT FOR DETERMINING AN OBJECT PROPERTY

(71) Applicant: Psykhe Ltd, London (GB)

(72) Inventors: Anabel Maldonado, Cottenham (GB); Rene-Jean Corneille, Cottenham (GB)

(73) Assignee: Psykhe Ltd, London (GB)

( * ) Notice: Subject to any disclaimer, the term of this patent is extended or adjusted under 35 U.S.C. 154(b) by 3 days.

This patent is subject to a terminal disclaimer.

(21) Appl. No.: 17/321,347

(22) Filed: May 14, 2021

(65) Prior Publication Data

US 2021/0366023 A1 Nov. 25, 2021

Related U.S. Application Data

(63) Continuation-in-part of application No. 16/897,712, filed on Jun. 10, 2020.

(30) Foreign Application Priority Data

May 22, 2020 (GB) .................................... 2007688

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0639* (2013.01); *G06Q 30/0643* (2013.01)

(58) Field of Classification Search
CPC ....................................... G06Q 30/0601–0645
(Continued)

(56) References Cited

U.S. PATENT DOCUMENTS 8,898,713 B1    11/2014  Price
9,454,782 B2    9/2016   Gunjan et al.
(Continued)

FOREIGN PATENT DOCUMENTS

WO    WO-2021234123 A1    11/2021

OTHER PUBLICATIONS

Deldjoo, Yashar, et al. "Movie Genome: Alleviating New Item Cold Start in Movie Recommendation." User Modeling and User-Adapted Interaction 29.2 (2019): 291-343. ProQuest. Web. Jul. 14, 2022. (Year: 2019).*

(Continued)

*Primary Examiner* — Jeffrey A. Smith
*Assistant Examiner* — Kennedy Gibson-Wynn
(74) *Attorney, Agent, or Firm* — Wilson Sonsini Goodrich & Rosati

(57) ABSTRACT

A computer system for matching users with visual items comprises a user-scoring component configured to receive user data about each of the users, and process the user data so as to assign the user a set of psychological test scores that characterize the user in terms of standardized personality traits of a predefined psychological test. Ann item-scoring component uses visual appearance information of each item to assign the item a corresponding set of psychological test scores indicating expected user visual preference for the item in terms of said standardized personality traits of the psychological test. A matching component matches each user with a set of the items, by matching the user's set of psychological test scores with the corresponding sets of psychological test scores of the items, and provide a matching output indicating, to the user, the set of items with which he or she has been matched.

15 Claims, 11 Drawing Sheets

Scoring and classification

(58) Field of Classification Search
USPC .............................................. 705/26.1–27.2
See application file for complete search history.

(56) References Cited

U.S. PATENT DOCUMENTS

| | | | |
|---|---|---|---|
| 10,387,940 B2 | 8/2019 | Akkiraju et al. | |
| 10,481,749 B1 | 11/2019 | Alfishawi et al. | |
| 10,963,939 B1* | 3/2021 | Zehr | G06K 9/6256 |
| 2008/0131858 A1* | 6/2008 | Gordon | G09B 19/0076 |
| | | | 434/327 |
| 2008/0311889 A1* | 12/2008 | Dunko | H04L 67/535 |
| | | | 455/418 |
| 2013/0174009 A1 | 7/2013 | Saldanha | |
| 2014/0081768 A1* | 3/2014 | Hocking, Jr. | G06Q 40/08 |
| | | | 705/14.66 |
| 2016/0042428 A1* | 2/2016 | Gou | G06Q 30/0631 |
| | | | 705/26.7 |
| 2017/0243281 A1* | 8/2017 | Leong | G06F 16/3344 |
| 2018/0075483 A1 | 3/2018 | Boyarshinov | |
| 2018/0114134 A1 | 4/2018 | Alva et al. | |
| 2018/0121986 A1 | 5/2018 | Akkiraju et al. | |
| 2019/0355041 A1 | 11/2019 | Sewak et al. | |
| 2019/0392003 A1 | 12/2019 | Zweig et al. | |
| 2020/0104710 A1 | 4/2020 | Vasudevan et al. | |
| 2020/0184278 A1 | 6/2020 | Zadeh et al. | |
| 2020/0311798 A1 | 10/2020 | Forsyth et al. | |
| 2021/0201373 A1 | 7/2021 | Trinh et al. | |

OTHER PUBLICATIONS

Retiveau, Annlyse N. "Individual Differences and the Perception of Complex Scents." Order No. 3157882 Kansas State University, 2004. Ann Arbor: ProQuest. Web. Sep. 8, 2022. (Year: 2004).*
Burr et al.: Can Machines Read our Minds? Minds and Machines 29(3):461-494 DOI:10.1007/S11023-019-09497-4 (2019).
Chamorro-Premuzic et al.: Personality and music: Can traits explain how people use music in everyday life? British Journal of Psychology 98(Pt 2):175-185 https://doi.org/10.1348/000712606X111177 (2010).
Chamorro-Premuzic et al.: Who art thou? Personality predictors of artistic preferences in a large UK sample: the importance of openness. Br J Psychol. 100(Pt 3):501-516 doi:10.1348/000712608X366867 (2009).
Costa Jr et al.: Cross-sectional studies of personality in a national sample: 2. Stability in neuroticism, extraversion, and openness. Psychol Aging 1(2):144-149 (1986).
Datasine: FAQs, retrieved online Jul. 2, 2020 available: https://datasine.com/faq/ (2020).
Elad et al.: Learning to Generate Personalized Product Descriptions. CIKM '19: Proceedings of the 28th ACM International Conference on Information and Knowledge Management Nov. 2019, pp. 389-398 https://doi.org/10.1145/3357384.3357984 (2019).
Five-Factor Model of Personality: How the 'super traits' of the Five Factor Model explain differences in personality and the way people behave. Psychologist World, accessed Sep. 28, 2020, available: https://www.psychologistworld.com/personality/five-factor-model-big-five-personality (2020).
Goldhill: We took the world's most scientific personality test—and discovered unexpectedly sexist results. Quartz, pp. 1-8 https://qz.com/1201773/we-took-the-worlds-most-scientific-personality-test-and-discovered-unexpectedly-sexist-results/ (2018).
John et al.: Big Five Inventory (BFI). Self Report Measures for Love and Compassion Research: Personality, Fetzer Institute, available: https://fetzer.org/sites/default/files/images/stories/pdf/selfmeasures/Personality-BigFiveInventory.pdf (1999).
Kansara: Cambridge Analytica Weaponised Fashion Brands to Elect Trump, Says Christopher Wylie. Business of Fashion https://www.businessoffashion.com/articles/news-analysis/cambridge-analytica-weaponised-fashion-brands-to-elect-trump-says-christopher-wylie/ (2018).
Maldonado: Case Study: Decoding the Uniform of Steve Jobs—The Psychology of Fashion. Retrieved online: Jun. 7, 2020 https://medium.com/macoclock/case-study-decoding-the-uniform-of-steve-jobs-the-psychology-of-fashion-6a33d16283a3 (2020).
McCrae et al.: A Five-Factory Theory of Personality. Handbook of personality: Theory and research. Guilford Press, pp. 139-153 (1999).
Paunonen: Big Five factors of personality and replicated predictions of behavior. J Pers Soc Psychol. 84(2):411-424 (2003).
PCT/EP2021/063551 International Search Report and Written Opinion dated Aug. 13, 2021.
Shankar et al.: Deep learning based large scale visual recommendation and search for e-commerce. arXiv preprint arXiv:1703.02344v1 [cs.CV] https://doi.org/10.48550/arXiv.1703.02344 (2017).
Soldz et al.: The Big Five Personality Traits and the Life Course: A 45-Year Longitudinal Study. Journal of Research in Personality. 33:208-232 (1999).
Soto: How Replicable Are Links Between Personality Traits and Consequential Life Outcomes? The Life Outcomes Of Personality Replication Project. Psychological Science 30:711-727 DOI:10.1177/0956797619831612 (2019).
The Yes: Fit and Style, retrieved online Jul. 2, 2020 https://theyes.com/#fit-and-style (2020).
Thread UK: Age and Budget, retrieved online Jul. 2, 2020, available: https://www.thread.com/signup/age-and-budget (2020).
Thread UK: Appearance, retrieved online Jul. 2, 2020 https://www.thread.com/signup/appearance (2020).
Thread UK: Home Page, retrieved online Jul. 2, 2020 https://www.thread.com/home (2020).
Thread UK: Sizes, retrieved online Jul. 2, 2020 https://www.thread.com/signup/sizes-trouser-fits (2020).
Thread UK: Style Photos, retrieved online Jul. 2, 2020 https://www.thread.com/signup/style-photos-consolidated (2020).
Vedel: Big Five personality group differences across academic majors: A systematic review. Personality and Individual Differences. Elsevier Ltd. 92:1-10 (2016).
Walerianczyk et al.: Personality and sport performance: The role of perfectionism, Big Five traits, and anticipated performance in predicting the results of distance running competitions. Personality and Individual Differences. 169(6):109993, pp. 1-10 DOI:10.1016/j.paid.2020.109993 (2020).
Webber: How exactly Stitch Fix's "Tinder for clothes" learns your style. Quartz https://qz.com/quartzy/1603872/how-stitch-fixs-style-shuffle-learns-your-style/ (2019).
Li, Zequn. Explainable Online Recommendation Systems with Self-Identity Theory and Attribute Learning Method. Order No. 27992507 University of Northumbria at Newcastle (United Kingdom), 2019. Ann Arbor: ProQuest. Web. May 18, 2022. (Year: 2019).
Office action dated Jun. 8, 2022 for U.S. Appl. No. 16/897,712.
Office action dated Sep. 1, 2021 for U.S. Appl. No. 16/897,712.

* cited by examiner

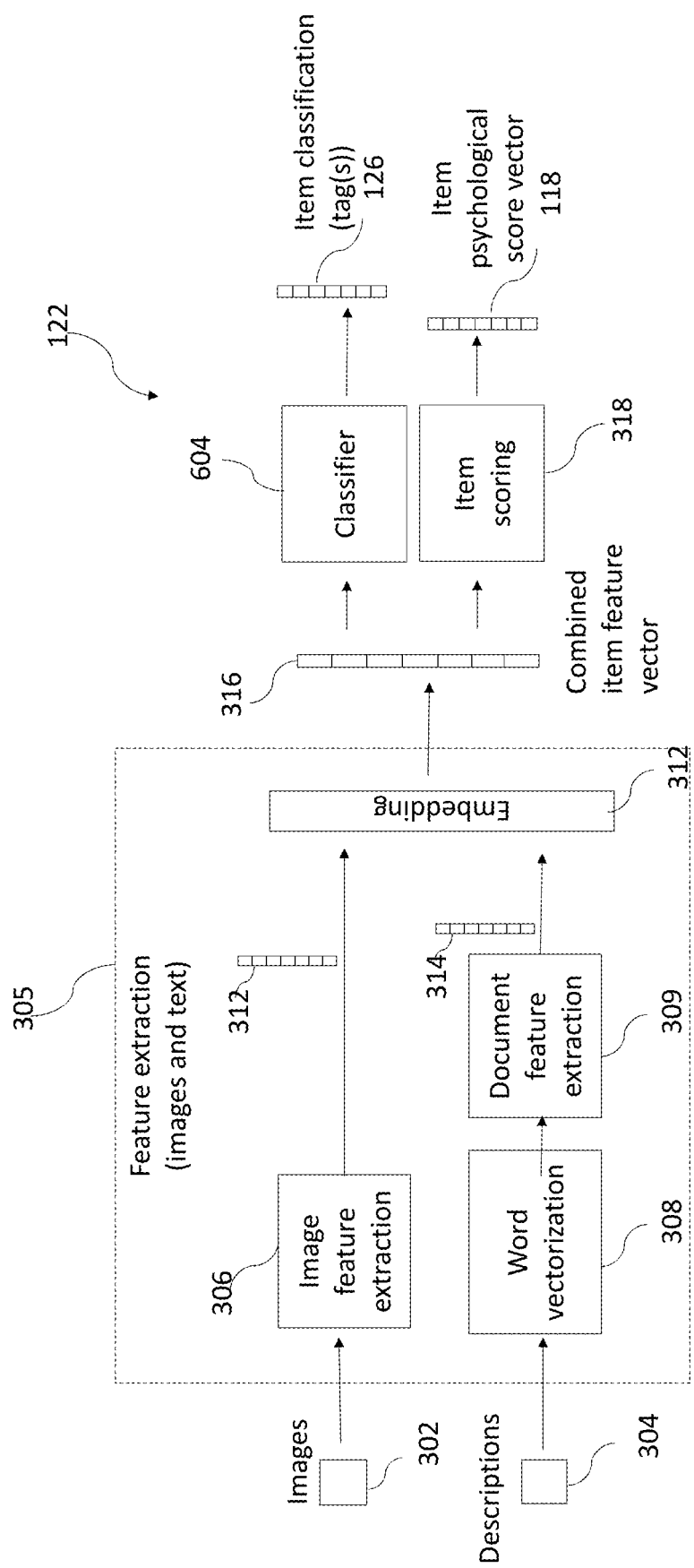
FIG. 3A – Scoring and classification

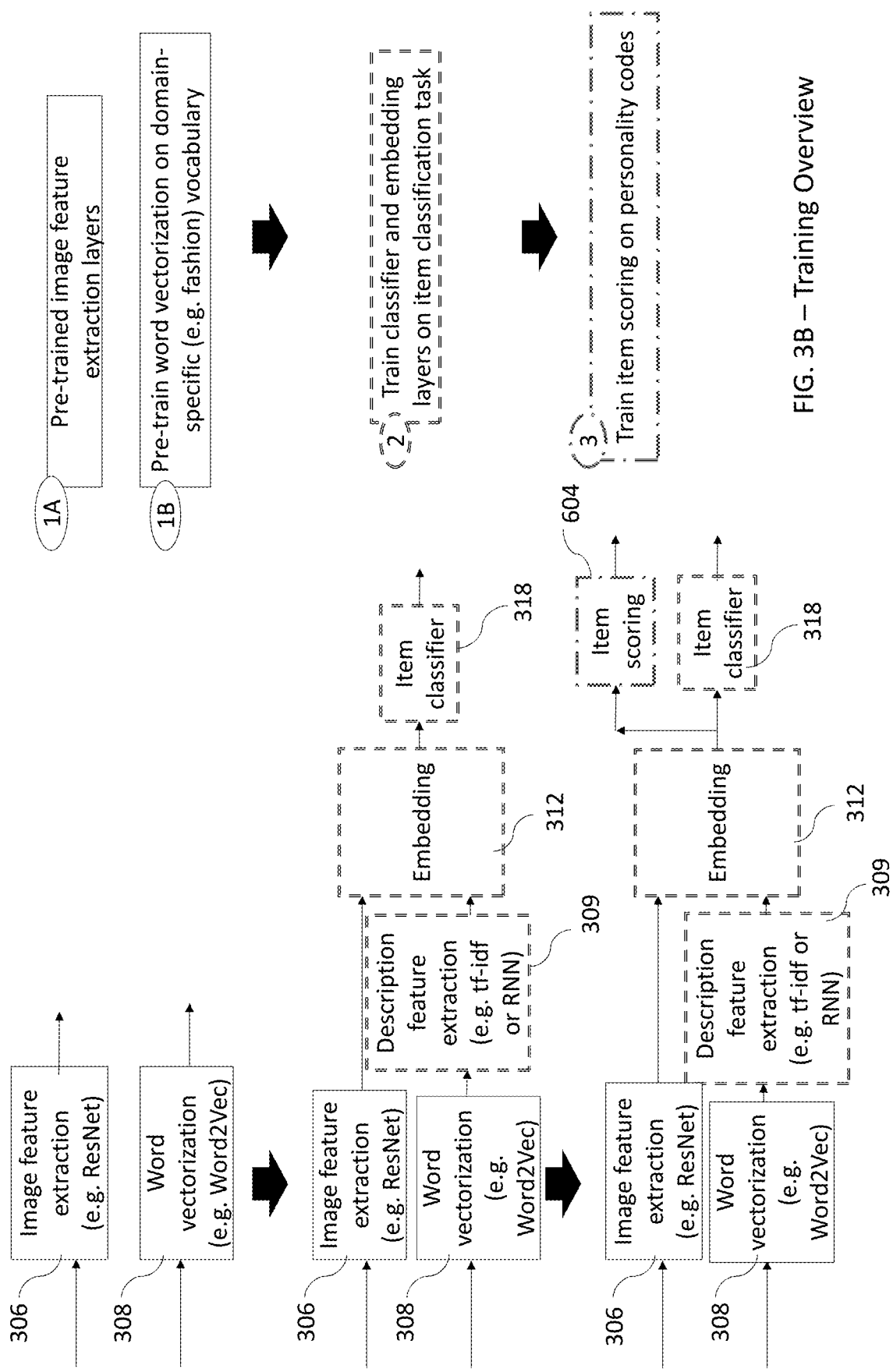
FIG. 3B – Training Overview

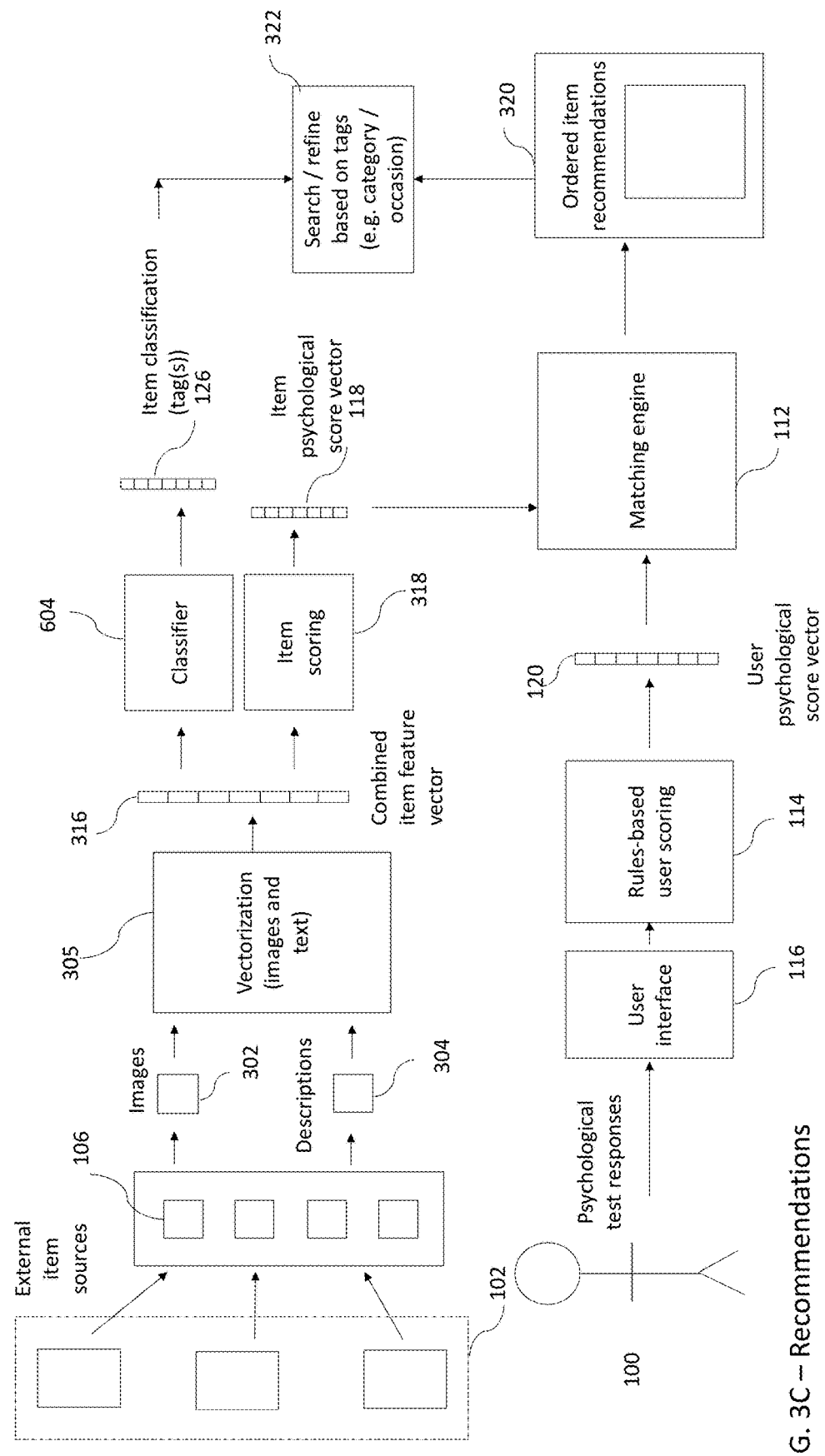
FIG. 3C – Recommendations

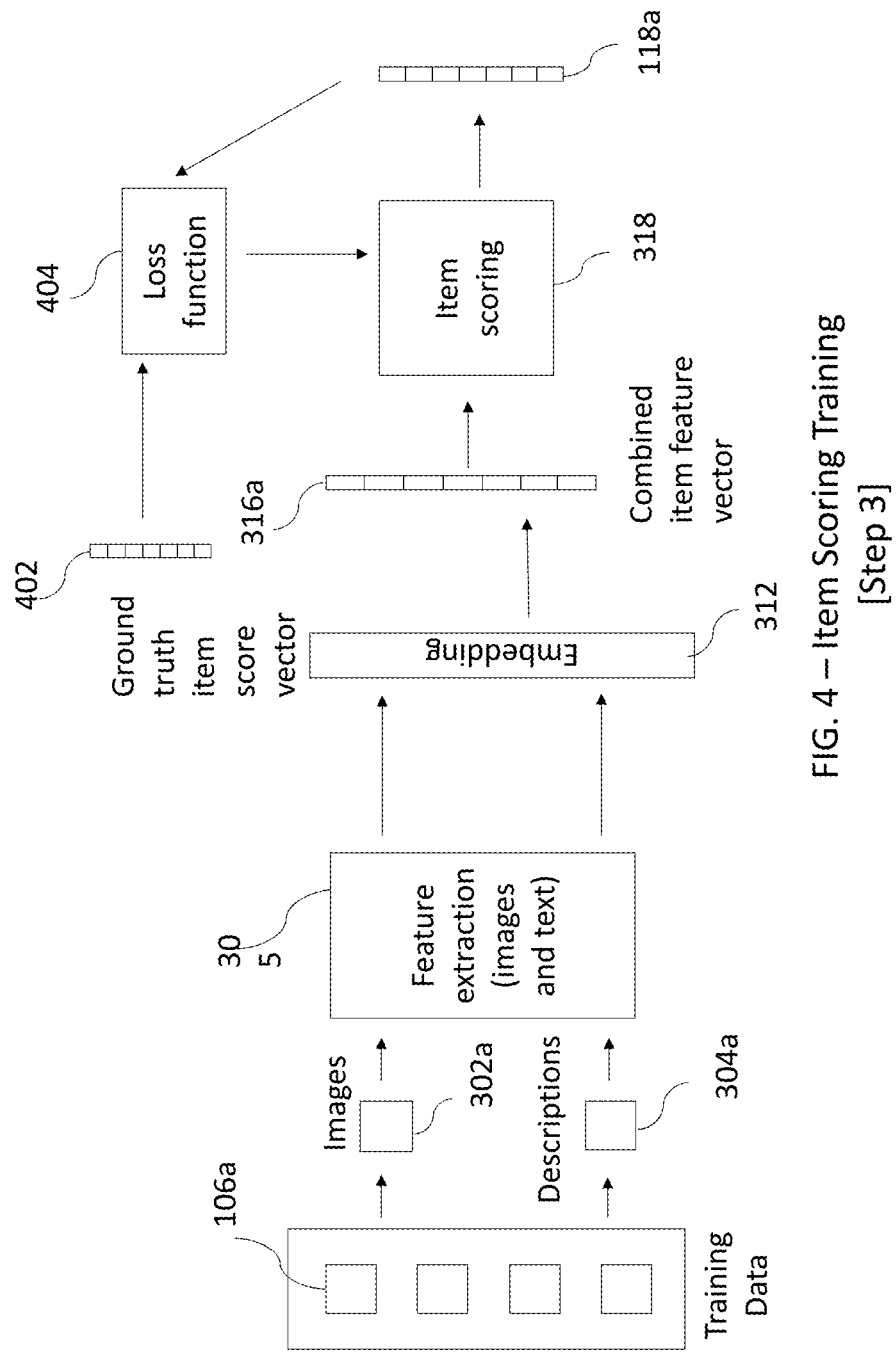
FIG. 4 – Item Scoring Training [Step 3]

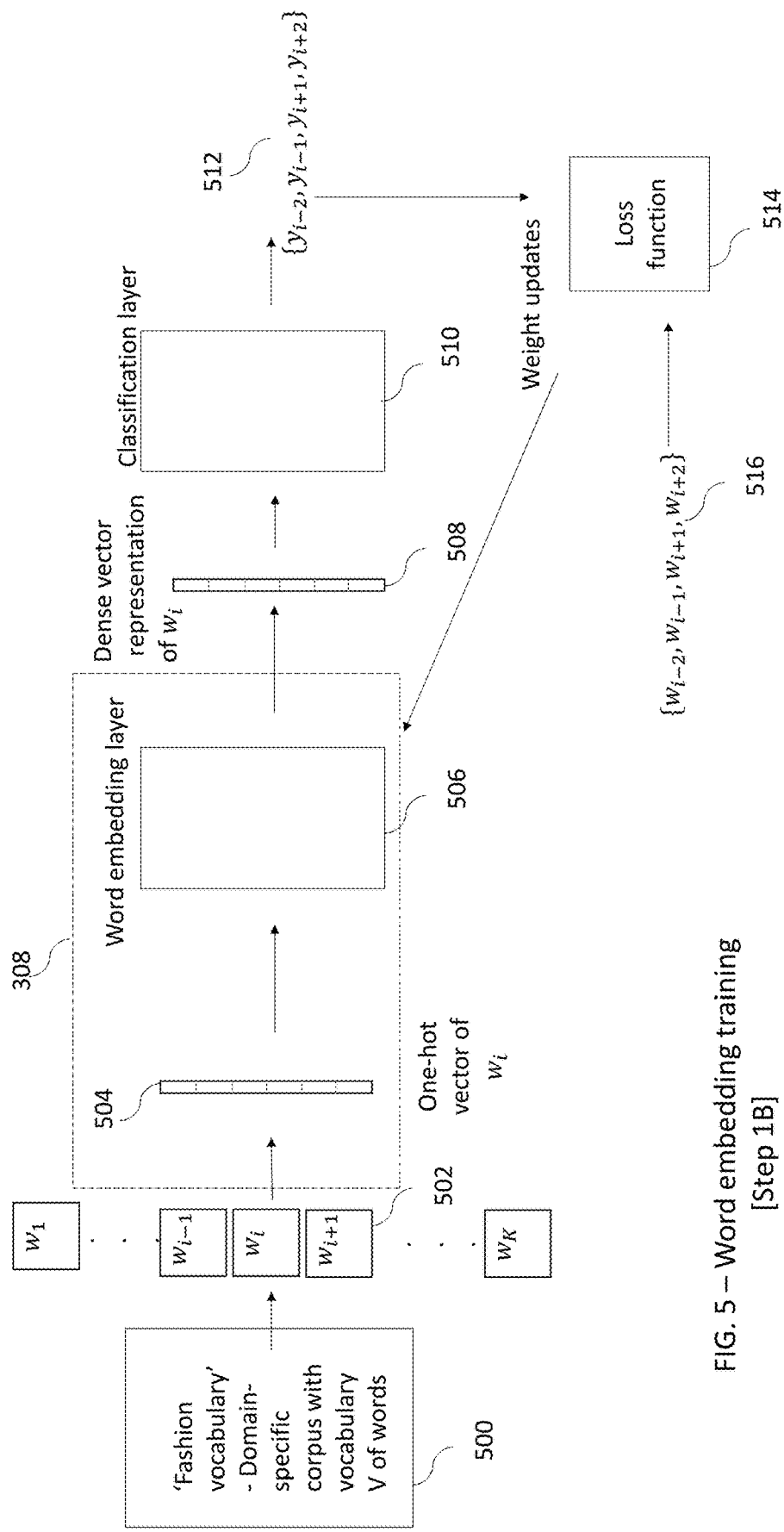
FIG. 5 – Word embedding training [Step 1B]

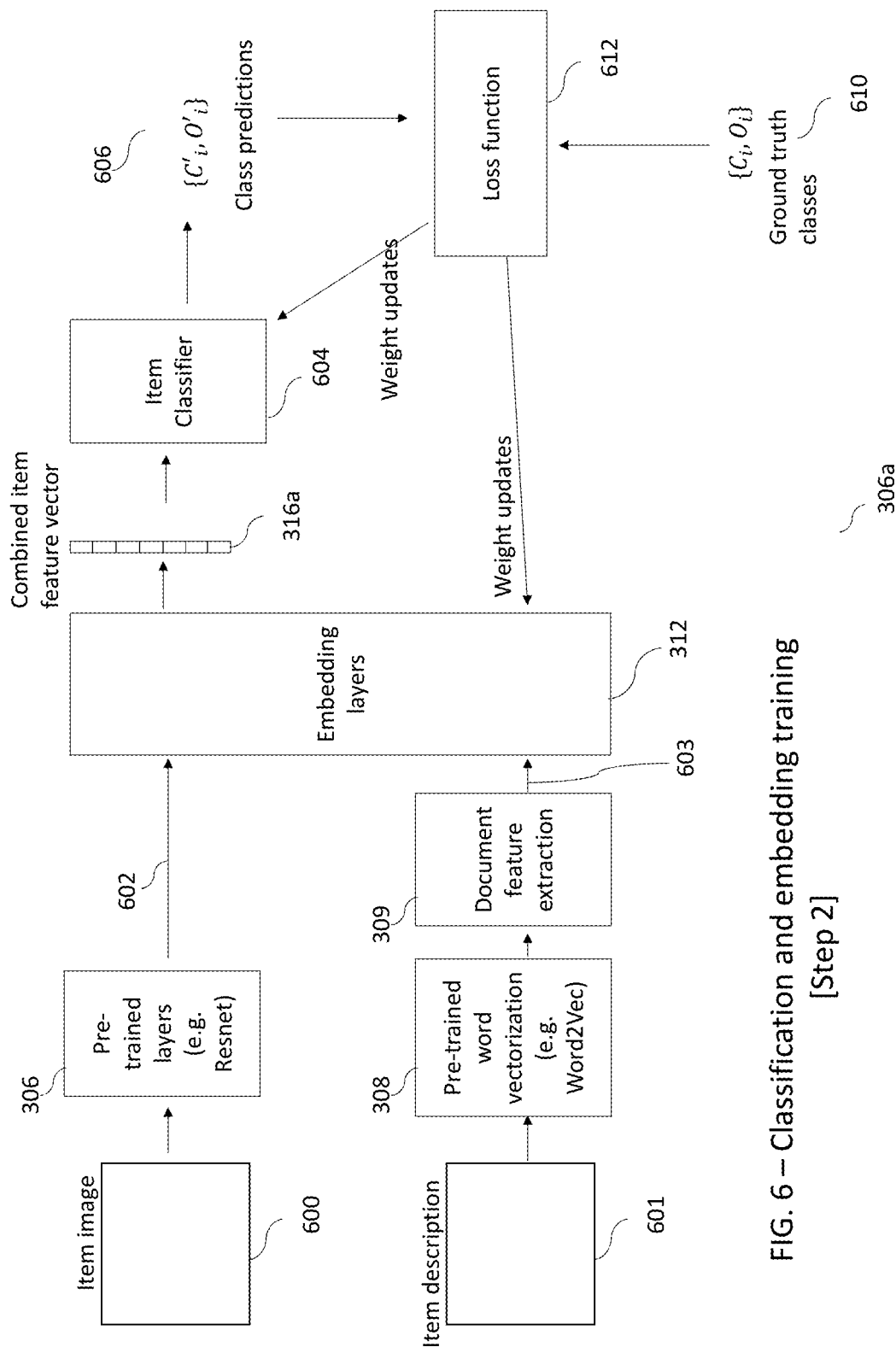
FIG. 6 – Classification and embedding training [Step 2]

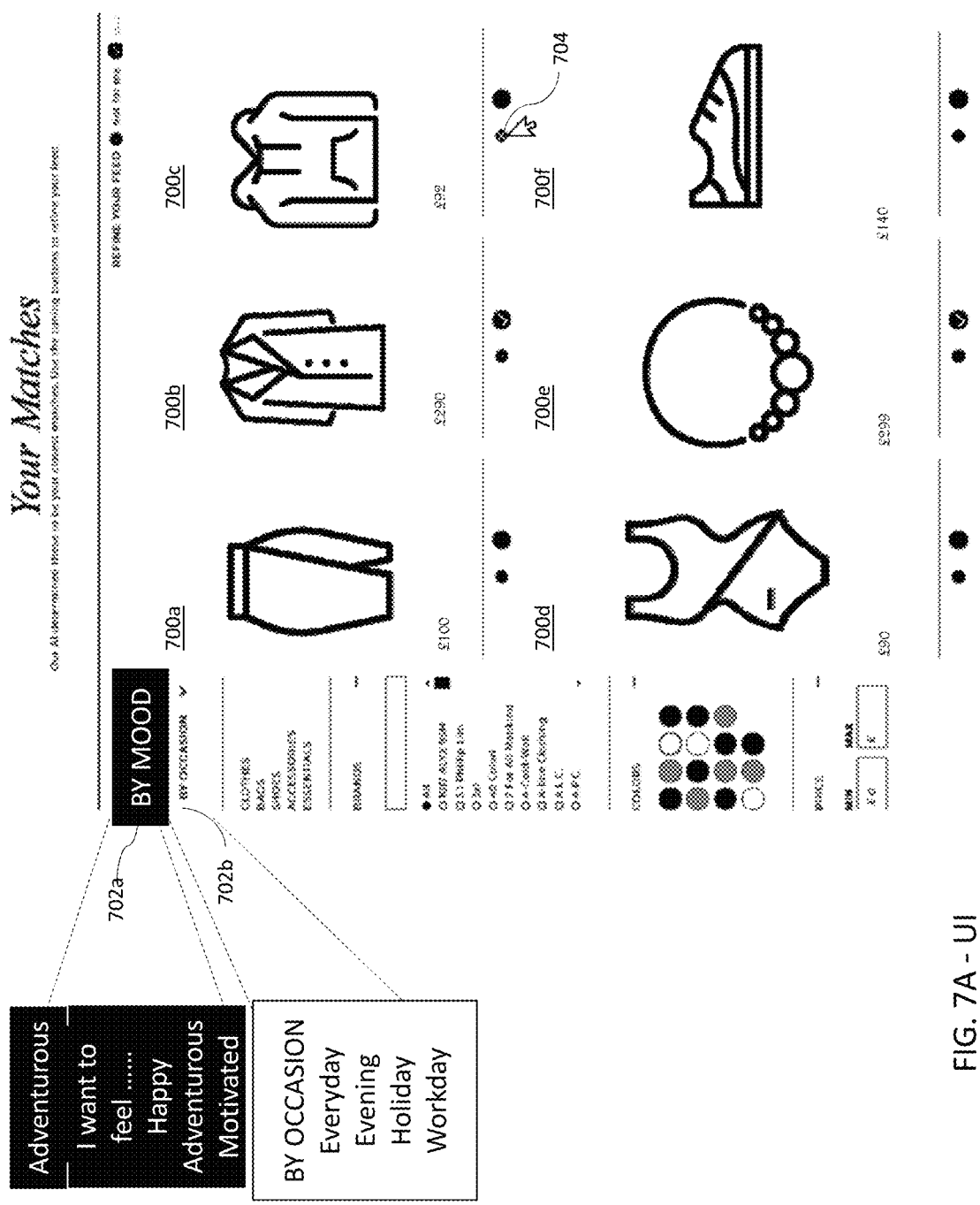
FIG. 7A - UI

SYSTEMS AND COMPUTER PROGRAM PRODUCT FOR DETERMINING AN OBJECT PROPERTY

CROSS-REFERENCE TO RELATED APPLICATIONS

This application is a continuation-in-part of U.S. application Ser. No. 16/897,712, which claims priority to Great Britain Patent Application No. 2007688.1, filed May 22, 2020, each of which are incorporated by reference herein in their entirety.

TECHNICAL FIELD

The present disclosure is related to computer technology for matching users with visual items.

BACKGROUND

Recommendation engines that seek to match users with items have been in use for some time. Increasingly, these engines use machine learning (ML) techniques to attempt to predict users' preferences from data collected about them. Individual preferences can vary significantly between different uses in a way that is hard to predict. An effective recommendation engine can accommodate a range of different user preferences, and robustly match different users with appropriate items in spite of those inherent difficulties. This, in turn, reduces the amount of time and effort required by different users to locate desired items that satisfy their own individual preferences.

SUMMARY

Many of the recommendation engines in use today are not particularly effective. For example, many apply some form of pattern recognition to users' browsing or purchase histories, but this is problematic in various respects because the model is lacking context around motivation for purchase (why) and understanding of the consumer (who), and hence does not make sense of the pattern. As such, these techniques are not always reliable, particularly when applied to insufficient user or product data, which can lead to unsuitable recommendations. Another issue is that many such techniques are based on the association and recommendation of "similar" items based on the aggregate behavior of many users and little or no product data, which is often a poor indicator of any user's individual preferences. The end result is often overly narrow or simply inappropriate recommendations.

The present disclosure uses fundamentally different techniques for effectively matching users with items. In contrast to many existing recommendation engines, visual appearance information about items is used holistically and explicitly (unlike, e.g., recommendation engines that simply try to infer associations between items based on aggregate user behavior, without actually examining the overall composite visual and aggregated aesthetic features of the items themselves). Moreover, this information is used in a unique way: the present techniques apply the science of psychology to the problem of determining and characterizing user aesthetic preference. Applications of the instant disclosure include determining an aesthetically pleasing response of a user based on attributes of the object, such as its visual appearance, texture attributes, brand information, general information, textual description, audio attributes, product features, and combinations thereof. The determination of the aesthetic quality of an object is based on the overall composite features of the object and the aesthetic and/or emotional response of the object to an individual. The determination of the aesthetic and/or emotional response of the object may be based on the psychological association of the object and the respective features. Conventional systems may identify one or more individual features and base recommendations based on aggregate user behavior and the individual features, while exemplary embodiments described herein create an overall composite and aggregate determination of the product as a whole in order to determine whether the product is likely to be aesthetically pleasing to a user.

Exemplary embodiments described herein include techniques, methods, and systems for assigning psychological traits to an object based on the psychological benefit that the object provides to different users with correspondingly different psychological needs. Exemplary embodiments described herein in terms of aesthetically pleasing and/or visually pleasing are encompassed by the broader objective of embodiments described herein including determining a psychologically pleasing association of an object to a user. Exemplary embodiments may therefore be used to match users to items that provide a psychological benefit/pay-off based on their individual psychological needs. For example, certain classes of item can invoke emotional responses, which may be a relevant factor in making an association for a like or dislike of a user. Aesthetic data may therefore be used herein to describe sensory information and/or emotional information associated with an object. Exemplary embodiments may use a combination of such aesthetic data associated with the sensory information and/or emotional information in order to identify and assign a psychological trait to an object.

Exemplary embodiments may be used to extend this technique to define a new object property that can be used to objectively characterize or describe an object. This object property can then be used in exemplary embodiments for providing recommendations, making associations between the object and other object(s), making associations between the object and a user or person, or combinations thereof.

In an exemplary embodiment, these techniques can quickly and accurately match different users with respective items that meet their individual aesthetic tastes in a psychologically robust manner, reducing the burden on the users to consider and reject unsuitable items. Chiefly underpinning the present solution is the recognition of a link between a user's visual and aesthetic preferences and their standardized personality traits as measured through structured, psychological testing (also known as "psychometrics") and a subset of psychology, personality science. This applies the principles of trait theory, the scientific study of human personality, in terms of distinct psychological "traits" or building blocks of personality. The aesthetic tastes may be based on the likes and/or preferences of the individual relative to an object's visual appearance, audial or acoustic impression, text description, other sensory perception, or combinations thereof.

An important trait taxonomy in academic psychology is the "Big Five", also known as the Five-Factor Model, which provides an objective and standardized framework for assessing human personality in terms of five core traits: Openness, Conscientiousness, Extroversion, Agreeableness and Neuroticism (the "OCEAN" traits). Big Five testing and other truly-psychological trait taxonomies have been the subject of rigorous scientific research, which has objectively demonstrated such models to be a useful predictor of human behavior, and preferences. For example, [1] examined individual differences in artistic preference in a sample of 91,692 participants who completed a Big Five personality inventory and found consistent correlations between artistic preference and the openness trait; see also [2], [3], [4].

An insight herein is that robust psychological trait testing can be used to make high-quality predictions about different users' aesthetic preferences for the purpose of recommending appropriate items to users.

These traits can also be used to define and encompass a new characteristic for an object that has conventionally not been perceived as having or being capable of having a personality inventory, similar to a human personality.

Building on this insight, the present technology automatically scores objects, based on objective information, in respect of the same personality traits that are used to score humans. This solution provides a structured framework in which the nuanced links between psychological traits and aesthetic preferences can be captured concretely as relationships between trait scores assigned to users and objects, and used to automatically match users with appropriate items. Embodiments of the instant disclosure may leverage advances in machine learning (ML) to assign such scores to items based on semantically rich ML features/embeddings. The object information may be related to an attribute based on a visual, acoustic, descriptive, tactile, gustatory, or scent attribute, or in a combination of such attributes.

An exemplary embodiment of the present disclosure provides a computer system for categorizing and/or classifying objects. The computer system may include an item-scoring component, an item-classifying component, a vectorization component, or any combination thereof. Exemplary embodiments of the computer system may also include a matching component in order to retrieve and/or identify items having a desired item-score or have an item-score in proximity to a desired item-score. The computer system may also use the matching component to provide a ranking of the items based on a comparison of the item-score to a desired item-score.

An exemplary embodiment of the present disclosure provides a computer system for matching users with objects (or objects with users and/or other objects). The computer system for matching users with objects (or objects with users and/or other objects) may include a user-scoring component, an item-scoring component, a matching component, or any combination thereof.

An exemplary embodiment of the present disclosure may include a user-scoring component. The user-scoring component may be configured to receive user data about each of the users, and process the user data so as to assign the user a set of psychological test scores that characterize the user in terms of one or more personality trait(s), similar or the same as a psychological test. The psychological test scores may include standardized personality traits of predefined and/or psychiatric industry-recognized psychological tests.

An exemplary embodiment of the present disclosure may include an item-scoring component. The item-scoring component may be configured to assign a trait score comprising scores associated with the psychological test scores and/or personality trait(s) of the user-scoring component, correlated to or based on the object's information. The object's information may include any of a visual, descriptive, verbal, tactile, gustatory, acoustic, or scent characteristic(s) of the object, or any combination of such attributes. The item-scoring component, for example, may be configured to use visual appearance information of each item to assign the item a corresponding set of trait scores that indicating expected user visual preference for the item in terms of the standardized personality traits or psychological test scores of the psychological test of a subject.

An exemplary embodiment of the present disclosure may include a matching component. The matching component may be configured to match each user with one or more objects. Exemplary embodiments of the matching component may be configured to match and/or correlate the user's set of psychological test scores with the corresponding sets of trait scores attributed to the object(s), and provide a matching output indicating, to the user, the set of object(s) with which the user has been matched.

One implementation of the system uses the Big 5 taxonomy and, in this case, each set of psychological test scores may be embodied as a test-score vector comprising five dimensions, each containing a score in respect of one of the five OCEAN personality traits. The OCEAN personality traits include Openness, Conscientiousness, Extroversion, Agreeableness, and Neuroticism.

While the Big Five is one of the most widely used trait taxonomies in the field of academic psychology, the president technology is not limited in this respect, and different psychological trait taxonomies can be applied. Other credible trait taxonomies have been the subject of psychological research. One or more of the personality traits of the OCEAN psychometrics may also be used in any combination according to embodiments of the present disclosure. However, two or more personality traits of a psychometric analysis is preferable, but not required.

Rigorous rules-based tests for scoring users in respect of personality traits have been developed. For example, various psychometric tests have been developed around the Big Five taxonomy, based on categorical responses to predefined questions. These include the Big Five Inventory (BFI), the updated BFI-2 inventory, and the NEO Personality Inventory (any of which might be supplemented with specific questions). Studies have shown these scores effectively predict behavior, and these tests are often used in academic psychological personality research (e.g. [6]).

Embodiments of the technology score users based on explicit psychometric testing. In such embodiments, the computer system may comprise a test delivery component configured to cause a structured series of questions to be outputted, in accordance with the psychological test, to each user at a user interface, and receive the user data in the form of responses inputted by the user at the user interface. The user-scoring component may be configured to assign the psychological testing scores to the user based on his or her answers received through the test delivery component. However, the possibility of scoring users in relation to the personality traits without explicitly testing (e.g. using trained model(s)) to predict the scores a user would achieve on the psychological test from other user data) is not excluded. Such predictive scoring may be used in combination with or as an alternative to explicit testing.

BRIEF DESCRIPTION OF FIGURES

For a better understanding of the technology disclosed herein, and to show how embodiments of the same may be carried into effect, reference is made to the following figures, in which:

FIG. 3A shows details of a machine learning (ML) pipeline for scoring and classifying items based on image and description;

FIG. 3B shows an overview of a staged approach to training the ML pipeline;

FIG. 3C shows further details of a computer system for matching a user with items based on psychological score vectors;

FIG. 4 shows how an item-scoring component may be trained;

FIG. 5 shows training of a model to extract word embeddings capturing domain-specific visual appearance information from item descriptions;

FIG. 6 shows simultaneously training an item classifier and one or more embedding layers to, respectively, classify items and extract features from item images and description for performing the classification; and FIGS. 7A and 7B show examples of a user interface for displaying, navigating and engaging with item recommendations.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Figure 1:
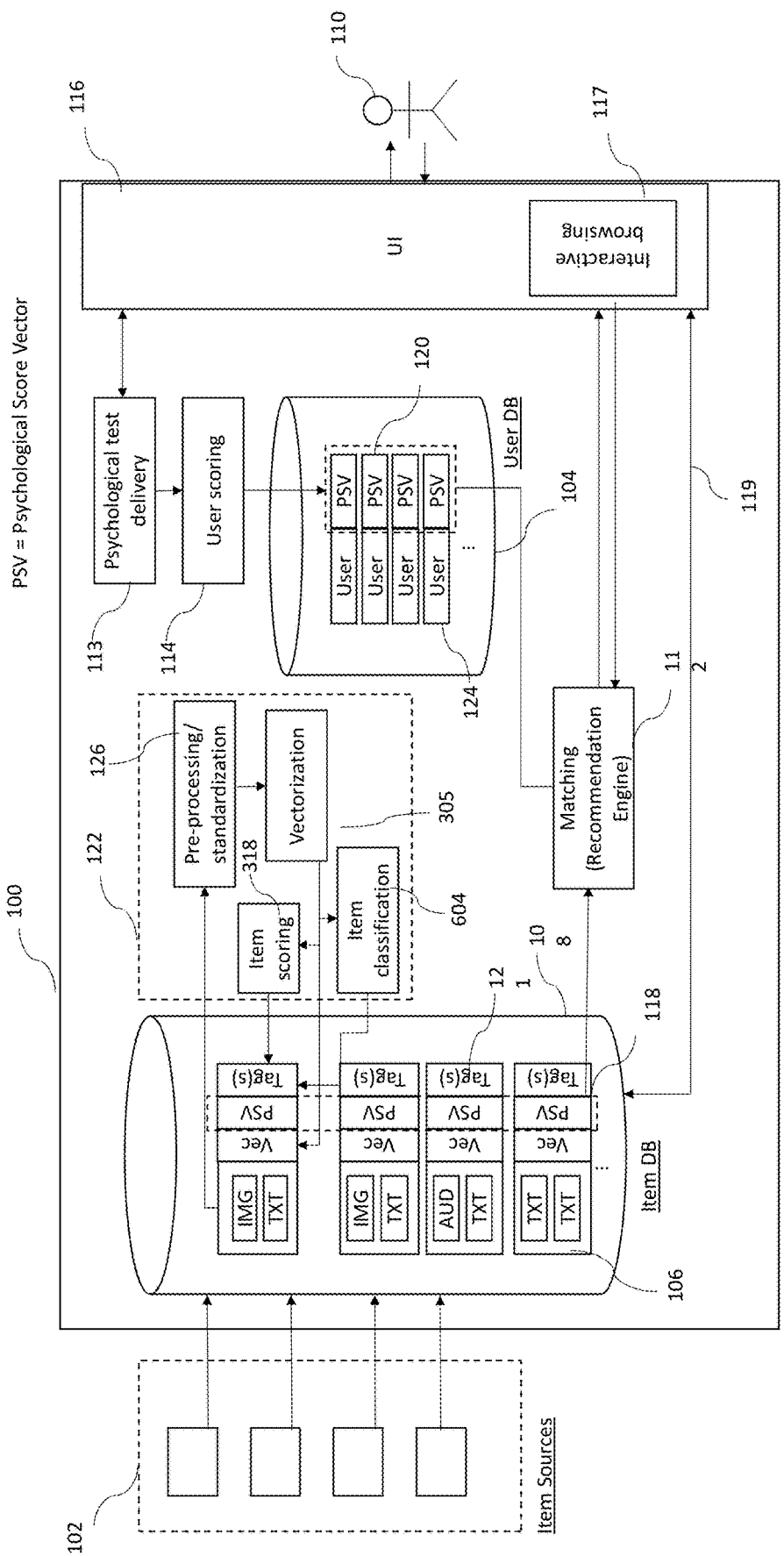
FIG. 1 shows a schematic function block diagram of a computer system for matching users with appropriate items.

FIG. 1 shows a highly schematic block diagram of a computer system (platform) 100 for matching users with items. The computer system 100 comprises a user database 104, which holds user data about users of the platform. The user data is obtained, at least in part, via a user interface layer (UI) 116 (rendering component). An item database 108 holds item data about items obtained, in this case, from a plurality of item sources 102, such as external platforms.

Users are matched with items by assigning psychological score vectors (PSVs) to both items and users, which score both users and items in respect of a common set of predefined psychological traits. Reference numerals 118 and 120 are used to denote item and user PSVs respectively in FIG. 1. A PSV may also be referred to as a set of "personality codes" herein.

Returning to FIG. 1, the user data in the user database 104 includes user PSVs 120 obtained by delivering a psychometric test to users via the UI layer 116, and each user's responses. A test delivery component 113 delivers the psychometric test to each user 100 who takes the test, by outputting test questions and receiving the user's responses to those questions via the UI layer 116. A user-scoring component 104 applies rules-based scoring to the user's responses to calculate his or her PSV, i.e. to score each user 110 in respect of each considered psychological trait within the framework of the psychometric test. In an objective test, questions would typically have numerical or categorical answers such as "strongly agree", "agree", "neutral/neither agree nor disagree", "disagree" and "strongly disagree", or rating agreement/disagreement on a numerical scale.

Once they have taken the test, the user's test score may be made available to them for their own benefit. Among other things, this is beneficial because it makes the system 100, and the basis for its recommendations, transparent to the user.

The user data is structured as a plurality of user profiles, where each user profile 124 may be associated with a user PSV computed in this manner. User profiles can also contain other user information to provide a custom experience to each user 110 of the platform.

In the present example, the psychometric test and scoring is based on the Big Five taxonomy. Each user and item PSV comprises five dimensions in "trait space", each containing a score in respect of one of the OCEAN personality traits. However, as noted, psychological trait taxonomies and psychological-type tests other than the Big Five inventories can be used in this context. While the use of established taxonomies, such as the Big Five, has various benefits, the system could be implemented with other, less-established forms of psychometric testing, including bespoke tests. In an exemplary embodiment, the psychometric test includes at least two psychometric traits.

An exemplary embodiment of the present disclosure provides a computer system for categorizing and/or classifying objects. The computer system may include an item-scoring component, an item-classifying component, a vectorization component, or any combination thereof. The item-scoring component may take in information from the vectorization component in order to assign an item score that indicates an association to each of the common set of predefined psychological traits provided for the user.

Exemplary embodiments may therefore be used to provide a new classification to an object. Previously, psychological traits have only been assigned to individuals because of the unique character of their respective personalities. These personalities influence how a person interacts with others, and makes decisions. The user's psychological traits therefore are based on the actions, decisions, and thoughts of the user because the user is capable of interactions. Inanimate objects, conversely, have not been assigned psychological traits because there is no psychology to an object. However, exemplary embodiments described herein include techniques, methods, and systems for assigning such psychological traits to an object based on the psychological benefit that they provide to different users with correspondingly different psychological needs.

An ML pipeline 122 is implemented within the platform 100, which has two important functions: vectorization (feature extraction), and item-scoring.

The item data in the item database 108 is structured as a plurality of item records, where each item record 106 comprises a set of item data specific to an item. In general, an item record 106 can contain item image data (IMG), item audio data (AUD), a textual item description (TXT), other item data that may correspond to one or more other senses, or combinations thereof, which can be unstructured, semi-structured or structured text. The image data, audio data, other item data, and item description are not necessarily received in any predefined structure or format. In this example, item data is received from multiple external platforms 102 and the structure/format of the data may vary between platforms. When it comes to the item descriptions, different languages may be used to describe similar concepts. A pre-processing component 126 is shown, which processes the item records to impose some degree of standardization on the form and/or content of the item records.

This can include reformatting/restructuring of the data and/or reformulating the item descriptions in accordance with a common vocabulary.

The item image data may also be processed to optimize them for processing within the ML pipeline 122. Item image data is illustrated as an exemplary embodiment. However, other item sensory data may be included, such as audio, tactile, descriptive text, scent, gustatory, visual, or combinations thereof. For example, instead of visual items, exemplary embodiments may include audio items having item audio data. The system may therefore be configured to systemize the psychological benefits of different types of music in order to recommend songs to different users based on their personality trait scores.

A vectorization component 305 (feature extractor) applies feature extraction to both the item data and item description (after any pre-processing), and each item record is augmented with a feature vector (VEE) computed by the vectorization component 305. In an exemplary embodiment, the item is a visual item and the item data comprises item visual data. The vectorization component therefore may perform a form of visual information extraction, where the feature vector encodes information about the visual appearance of the item in a form computer-interpretable form, which can come from one or both of image and text. Further details of the vectorization are described below. Each item's feature vector is distinct from its item PSV. The feature vectors are defined in a multi-dimensional "feature space" used to characterize the visual appearance of items, which may have a relatively high dimensionality compared with the trait space. Other information extraction may also be included within the scope of the present disclosure. For example, for item audio data, audio information extraction may occur to define the acoustic attributes of the item in a computer-interpretable form, which can come from one or both of the audio and text. In this example, the feature space may be used to characterize the acoustic attributes of the item.

In an exemplary embodiment, the item PSV is computed by an item-scoring component 318, which receives the item feature vector and uses it to score the item in respect of each of the five OCEAN personality traits or other common set of predefined psychological traits.

This leverages the insight as to the link between personality traits and the item, such as the item's overall appearance or characteristics. The present disclosure recognizes that items can be assigned meaningful PSVs by virtue of the correlation between users' personality traits and their individual aesthetic preferences. An item with a PSV similar to that of the user is more likely to be aesthetically and psychologically pleasing to that user. Each item record is augmented with its computed PSV to facilitate subsequent matching. Item-scoring can be formulated as a regression or classification problem over the dimensions of the trait space. Classification may be more appropriate when items are scored categorically, for example on an integer scale of 1 to 5 (where the integers are simply convenient class labels), whereas regression may be more appropriate when items can have scores anywhere within a continuous range. An initial score over a given range may be converted to a categorical scale by partitioning the set of scores into a predefined ranges and mapping these ranges to categorical values. For example, a range from 1-100 may be mapped to a scale of 1-5 by partitioning into ranges of 1-20, 21-40, etc. and mapping each range to integers (quantizing) 1, 2, etc., where 1 corresponds to a low score for a given trait and 5 corresponds to a high score. The initial score could be determined using regression (e.g. continuously in the range [0,100]), or classification over larger number of classes (e.g. 100 classes), prior to quantization.

In addition, an item classification component 604 is used to classify each item, in relation to predefined item classes such as fashion-specific "category" or "occasion" classes in the case of items of clothing (further examples are given below). This classification is also based on both text and sensory data (such as image data). A classification result associated with an item may be referred to as a "tag" 121 and classification may also be referred to as tagging. These tags are associated with the items in the item database 108, and may be used to further filter or search the recommended items presented to the user.

The item scoring, by the item scoring component 318, and item tagging, by the item classifier 604, may not be based on the sensory data (such as the image(s) of the item) alone, but may also include a combination of sensory data (such as image(s)) and text description. Both may use the same output of the vectorization component 305 to carry out their respective tasks of item scoring and item classification.

In current ecommerce, category and occasion classification would need to be carried out manually by human merchandisers who label corresponding ground truth classes in a back-end system. By contrast, here, the classification component 604 is trained to execute this classification autonomously, using both images and text.

The combined effect of item scoring and item classification is that the system can automatically determine that a particular item is, say, a maxi-dress for an evening occasion, ideal for a 43523 personality score (or, a 43522 person who wants a positive mood boost—see "Browse by Mood" below).

The operation of the machine-learning pipeline 122 described in further detail below, with reference to FIG. 3.

The way in which items are scored is consistent with the way that the users are scored, to facilitate a direct, mathematical comparison of item and user PSVs based on a distance metric defined over the trait space. In an exemplary embodiment, the user data associated with an individual user stored in the user database may comprise user PSVs, with a PSV for each of the common set of predefined psychological traits. The item data associated with an individual item stored in the item database may comprise item PSVs, with a PSV for each of the common set of predefined psychological traits. Each of the user PSVs and the item PSVs may be scored along the same value scale.

The item-scoring component 318 may comprise one or more layers of a neural network, where the final layer of the neural network may be a classification layer which classifies each combined feature vector in respect of a set of score classes (e.g. classes 1 to 5) in each of the trait dimensions (e.g. O, C, E, A, N). The item-scoring component 318 can take various forms, such as a perceptron or a set of support vector machines (SVMs).

Exemplary embodiments of the computer system may also or alternatively include a matching component to retrieve and/or identify items having a desired item-score or having an item-score in proximity to a desired item-score. The computer system may also use the matching component to provide a ranking of the items based on a comparison of the item-score to a desired item-score.

Exemplary embodiments may therefore be used to provide a new classification to an object. The psychological trait(s) of the object may be used in different ways, as explained herein. For example, the psychological trait may be used to select an object, match an object to a user or group of users, match an object to one or more other objects, prioritize or rank objects, etc. The matching component may take in an input and/or otherwise identify an input comprising one or more psychological traits. The input may be in the form of a user input and/or automatically generated input from within the system. The input may be from the user scoring component, for example, to provide a PSV for the user, and/or from the score modification component that may provide a modified PSV for the user and/or object or as an offset for the comparison. The system may provide other target PSV to perform a comparison. For example, the system may include and/or identify a target PSV based on: a single user, an identified group of users or class of individuals, a target objective based on a sensory-emotional response, or other PSV identified by the user and/or the system and/or other source. The comparison may thereafter be used to make recommendations, associations, rank, match, or otherwise compare the items having an item PSV against the input PSV.

The system 100 also comprises a matching component (recommendation engine) 112 that matches users with appropriate items based on their respective PSVs 120, 118. Given any user with a particular PSV, the recommendation engine 112 is able to locate appropriate items that are likely to meet the user's individual aesthetic tastes as those having similar PSVs. A recommendation (matching output) may, for example, take the form of a list of items ordered by a matching score based on the similarity between the item PSVs and the user PSVs. The matching score between to PSVs may, for example, be the distance between them in trait space.

Details of the matching algorithm are described below, with reference to FIG. 3.

Recommended items can be indicated to the user 110 via the UI layer, allowing the user 110 to access the corresponding item records in the database 108 (as denoted by the two-way arrow labelled 119), without having to search for these items manually, and without having to consider and reject numerous unsuitable items. Such manual searching would typically involve searching by brand or by basic color (e.g. 'blue'), etc. which is time-consuming and not necessarily fruitful, particularly when a user has no clear objective. By contrast, here, the primary input required on the part of the user is his or her responses to the questions of the psychometric test. This typically takes a few minutes to complete and only has to be done once, to compute the user's PSV. Unlike other user preference tests, the personality traits of a user are mostly stable throughout a user's lifetime. Therefore, exemplary embodiments may include conducting a single test to determine a set of PSVs that can be assigned to the user without requiring a new test or determination of PSVs for each shopping or periodic shopping experience. As noted, upon completing the test, the user also receives their score for their own benefit and understanding. As new items are recorded within the system, they are vectorized and scored in the above manner, and new item recommendations can be made, as appropriate, based on the user's existing PSV (without necessarily requiring any further input on the part of the user). This significantly reduces the burden on the user in navigating the item database 108 which could contain a potentially millions of items. In this sense, the recommendation engine 112 together with the corresponding functions of the UI layer 116 provide an improved graphical user interface for efficiently navigating the item database 108.

Suitable recommendations can be made for products that it might never even have occurred to the user to search for, but which the system is nonetheless able to recommend based on its knowledge of the user's personality, and the underlying links between personality and preferences, crystalized via the structured product-scoring.

In the context of Big Five testing, a personality code is an amalgamation of a user's "5 scores", i.e. their scores against the OCEAN traits, e.g. (O4 C3 E4 A2 N4). The 5 scores are defined on a simplified scale of 1-5 in the following examples. Visual and text information about items (products) yields a corresponding code for each product, i.e. scoring the product against the same personality traits, that matches the user to a product. People, who have individual personality differences, react differently to different things, and this scoring framework systemizes this affinity so that users can be matched to items with which they would have the strongest positive reactions, helping them to find things they want using structured knowledge of their personality.

The psychological testing framework herein stands in contrast to explicit "style quizzes" and the like that are used in a few ecommerce platforms available today. These platforms attempt to assign metrics such as "style types" to users. However, these are non-psychological, and instead rely on asking direct questions about user's style preferences, favorite brands, sizing, budget etc., i.e. asking users direct, superficial questions about their item preferences and assuming it is possible to accurately characterize those preferences based on the answers that they give.

In contrast, the psychometric test used herein does not simply ask users about their item preferences directly, but instead seeks to measure and characterize their inherent personality traits in a scientific manner, and infer their visual (other sensory, or experiential) preferences from their personalities. Exemplary embodiments described herein may include questions to determine personality traits. Exemplary embodiments described herein may include questions to gather additional data to better understand the relationship between the personality traits and aesthetic preferences of a user. Exemplary embodiments may therefore include additional questions in addition to those to determine the personality traits of the user to assess local effects that may impact a user's preference. For example, additional questions may include what kind of style preferences a user has, from more conventional or conservative, to more unique or liberal. Other questions may be included that can impact preferences, such as current location, travel destination, price range sought, and body type, fit preference, when it comes to apparel etc. When these additional questions may be used, they can act as an additional filter on the results generated from the association made on the psychological basis and/or may be used similar to the dynamic adjustments on the user's PSV as described herein, for example, with respect to browse by mood or occasion searches. These additional questions may be used to shift the psychological association made between a user's PSV and the object's PSV.

This indirect, psychological approach is counterintuitive: why test users' personalities in this way, rather than maintaining the status-quo style quizzes and asking users directly what they want? For example, why ask a user if they like staying out late at parties, to find out they are extroverted, to assume they like bright colors; why not just ask them which colors they like?

One reason is that the status quo does not allow for the capture of depth and nuance of human personality and the gamut of specific tastes, nor of the vast amount of available product. A user might hate or love a dress based on something seemingly insignificant, such as a collar shape. Asking if one "likes pink" does not mean much. Bright pink (confident, shocking, aggressive) has a much more assertive feel than pale pink (gentle, agreeable, feminine), and the effect of that color application can yet vary greatly depending on the garment's brand, shape, pleat, details, materials, etc. It is much more effective to understand the specific overall feel of what they like and the specific overall feel of an item based on the amalgamation of all details. The combination of five scores captures these nuances in user and product. A user might be extroverted, but they might also be highly conscientious (dutiful), which would temper their personality and visual or aesthetic preference, and the remaining three scores would also affect their taste and affinity. A yellow floral dress might be feminine in aesthetic, but might be designed with a black leather belt that offsets that quality, and changes the overall feel.

Another reason is that style-quizzing way is not transferrable. If someone says they like a particular brand, that may be useful for recommending that brand, but not for new brands that enter the market; this is one example of data whose usefulness is limited because it provides no information as to why someone likes something. The user may also provide an input that they like a particular brand, but may only like a subset of products within that brand. For example, a person may only like handbags from a particular brand and not their shoes or belts. Indicating a like for the brand would therefore introduce a number of irrelevant products for the user to consider.

Another benefit of using psychological traits is that psychological research has provided compelling evidence that a person's traits remain relatively static over time (e.g. [5]). Hence, a user's PSV is expected to remain relevant and can continue to be used to make relevant item recommendations over time, without the user having to retake the test.

In summary, benefits of the present trait-based psychological scoring and recommendation framework include stability over time, flexibility (including the ability to accommodate new items without re-testing users), and deeper, more accurate insights into user's preferences than could be obtained through superficial style quizzes and the like, ultimately resulting in better recommendations, and thus a reduced burden on users search for/navigate inappropriate items.

While autonomous, trait-based recommendations are an exemplary element of the platform 100, this is not necessarily a purely "static" process in which the user simply receives recommendations of particular item records in the item database 108. In the present example, one or more interactive features 117 may be implemented within the UI layer 116 that allow the user to tweak or otherwise engage with the recommendations and in an interactive manner.

Examples of such interactive features 177 are described below.

Figure 2:
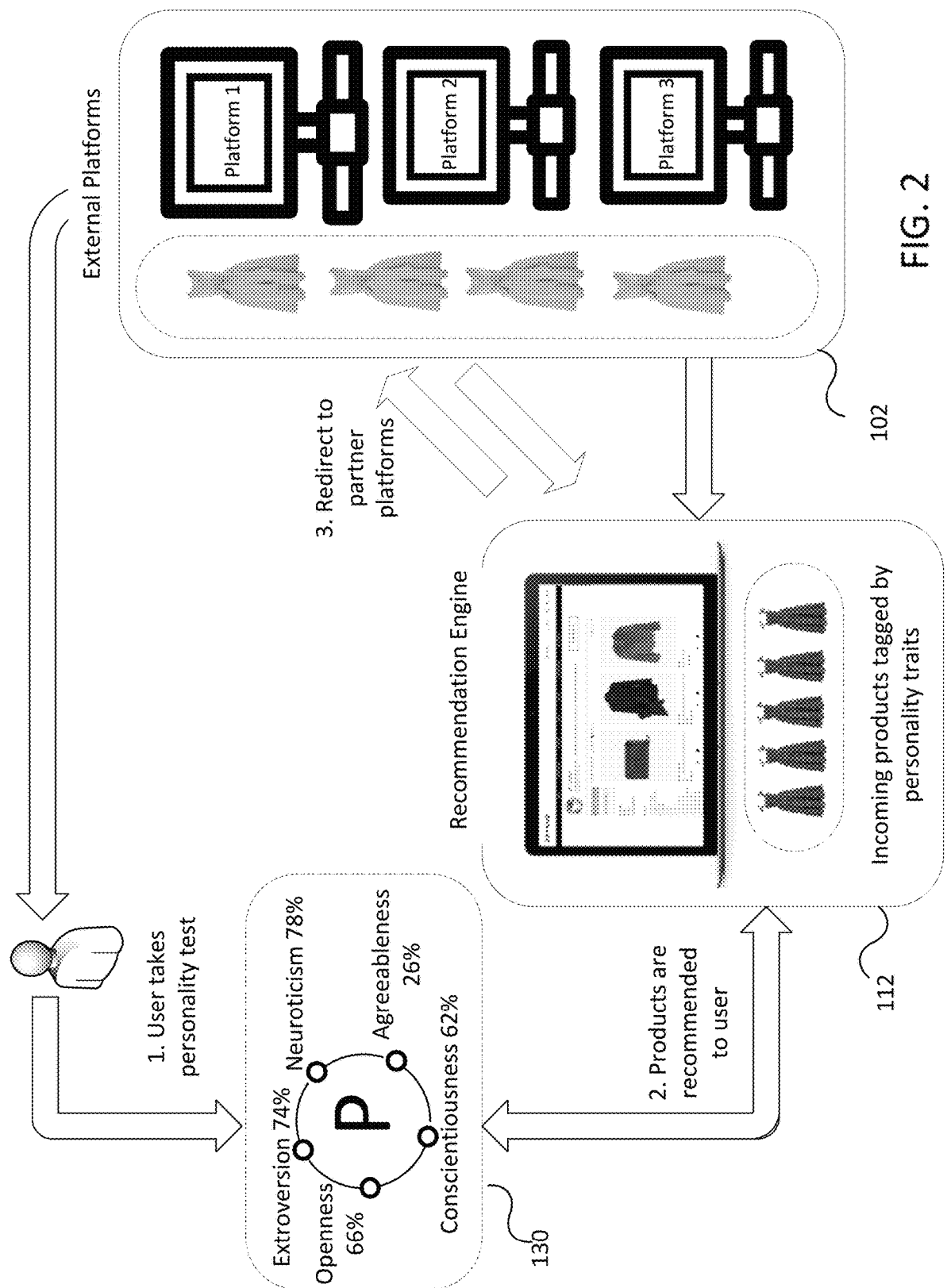
FIG. 2 shows a data flow within the computer system, front-end architecture and external platforms.

FIG. 2 shows a possible data flow within the platform 100 to recommend products to users 110. The diagram shows the intake of user data including personality test scores 120 (step 1), and the input item data from a plurality of external platforms 102. The recommendation engine 112 receives the incoming items, which may not be tagged when they are received from the external platforms 102, but are automatically tagged with classes 126, such as category and occasion, within the system 100 itself. Within the system 100, each item is also scored with an item score 118 associated with the personality test offered to users. The recommendation engine 112 matches the user 110 with the items that correspond most closely with the user's personality score vector (step 2). The recommendation engine 112 may present the user with an ordered list of recommended items based on the matching output. The recommendations may include links that redirect the user to the plurality of external platforms 102 which provide the recommended items for purchase (step 3). Such links are contained within the item records in the item database 108, to provide a distributed item management system in cooperation with the external platforms 108. In this case, effective recommendations allow the user 110 to navigate the multiple item platforms 102 effectively, based on a single set of relevant recommendations.

Machine-Learning Pipeline—Overview

FIG. 3A shows further details of the ML pipeline 122 for use in the example of an image file and associated data for visual objects and/or association based on visual attributes. In this particular example, the feature extractor 305 is shown in more detail, and is shown to comprise an image feature extractor 306 and a word vectorization component 308. These components operate on the item image data and item descriptions respectively, to extract image features 312 and word embeddings 314 respectively.

The system takes input images 302 and associated descriptions 304 of visual items from the item records in the item database 108.

The item images are input to the image feature extractor component 306. The image feature extractor 306 outputs a feature representation 312 of the item image and may, for example, have a Convolutional Neural Network (CNN) or other neural network architecture. The image feature extractor 306 may, for example, comprise one or more trained CNN layers, which extract semantically rich image features 312 from the item image data 302.

One example of a suitable image extractor is ResNet. A set of "generic" pretrained weights is sufficient for this purpose, for example as trained on a publicly available image set on an arbitrary image classification task (not necessarily domain-specific, e.g. not necessarily specific to fashion).

The input to the item feature extractor 306 can be one or multiple images. Multiple images are useful, particularly when they provide views of the item from different angles/perspectives, as this allows richer image features to be extracted. The number of item images input to the item feature extractor 306 need not be fixed, i.e. different numbers of images could be used for different items. For example, a Recurrent Neural Network (RNN)-CNN hybrid architecture may be used that can receive an image or sequence of images of arbitrary length and extract image features therefrom.

The exemplary system may also take in any combination of sensory data besides or in addition to item images. For example, the image feature extractor component may be a sensory feature extractor component. The sensory feature extractor component may analyze an audio file, for example, to extract audio features. These features may include elements such as tempo, key, discord, type of music, etc. For another example, the sensory feature extractor component may analyze textual descriptions. The text may be in written work products, such as literature, and/or may be text descriptions of an object, or of vacation locations. The sensory feature extractor may determine features of the text in order to make sensory characterizations about the object.

The word vectorization component 308 takes a text description 304 of the item and embeds the description as a representative word vector 314. This component 308 is a pre-trained word embedding model. In contrast to the feature extractor 306, the training of the word vectorization component 308 is domain-specific (i.e. specific to the types of items within the system, such as clothing or items). In particular, the pre-trained word embedding model uses a corpus of domain-specific language to learn a vector representation of words based on their respective contexts within sentences. This is based on a domain-specific vocabulary, particular to the class of items under consideration. For example, in the case of fashion items, this could be a fashion-specific vocabulary. Other domain-specific classes of items, may include, for example, furniture for home decoration or office. Exemplary embodiments of domain-specific classes of items may also include music categories.

The word vectorization component 308 has been trained to map each word of the vocabulary to a semantically rich numerical-feature vector (embedding). One example of a suitable technique is "Word2Vec" trained over a domain-specific vocabulary. For each word in the vocabulary that appears in the text description 304, the corresponding embedding is known from training. Hence, a set of embeddings can be obtained for each text description 304.

A document feature extractor 309 converts individual word embeddings (word vectors) of an item description 304 to a representation of the item description 304 as a whole, such as, a description vector 314, representing the description 304 as a whole in a fixed number of dimensions, independent of the length of the description 304. This vector may be a weighted average of the word vectors making up the description that may use term frequency-inverse document frequency (tf-idf) to calculate the weightings. This has been found to be an efficient approach for a highly specific vocabulary. As another example, the document feature extractor 309 could have an RNN architecture, which provides a fixed-length output for variable-length inputs. In this case, the input to the RNN would be a sequence of word vectors extracted from the description and the RNN would compute the description vector 314 from the sequence of word embeddings.

An RNN has the advantage of taking into account the word vector sequence rather than simply looking at an average. For example, when a word is found to be important (in weight) by a tf-idf, e.g. the word "leather", this can skew the model's final decision. An RNN can help to better understand nuances—for instance ambiguous names such as 'shirt dress'. Once form of suitable RNN is a LSTM (Long Short Term Memory network).

An embedding component 312 receives the sensory (e.g. image in this example) and description features 312, 314 and processes them to provide a combined feature vector 316 (item embedding). This encodes information about the visual appearance of the item that has been extracted from the combination of the image data and text of the item description. The embedding component 312 may, for example, take the form of one or more (hidden) neural network layer (embedding layer(s)).

Both the item-scoring component 318 and the item classifier 604 may use the same output of the embedding component 312, namely the item embedding 316.

The item-scoring component 318 has been trained to score each item in trait space, based on its combined feature vector 316. For example, as noted, the item-scoring component 318 could take the form of a set of SVMs configured to classify the combined feature representation according to the set of personality traits. Hence, the output is an item PSV derived from the combined feature vector 316.

Machine-Learning Training—Overview

FIG. 3B provides an overview of how the ML pipeline 122 is trained for the example of basing associations based on an attribute including visual sensory information including the image feature. As shown in FIG. 3B, this is a "staged" approach, which has various benefits as set out below.

As noted above, a pre-trained image feature extractor 306 is used, which can, for example, be pre-trained (Stage 1A) on a publicly available dataset, on a generic classification task. Any state-of-the-art image feature extractor can be used for this purpose.

The word vectorization component 308 is also pre-trained (Stage 1B) but, whereas the pre-training of the image feature extractor 306 is generic in this example, the pre-training of the word vectorization component 308 may be highly domain specific, using a bespoke vocabulary specific to the domain of the items. For fashion apparel items, this would be a fashion-specific vocabulary. Other domain specific categories may include fashion, furniture or objects for home décor and/or office décor, or items such as makeup, vehicles, fitness classes, or travel packages. As can be seen, the domain specific categories may be broadly defined, such as in fashion, or narrowly defined such as home décor. The definition of the specific domain may depend on the domain itself and commonality in language within subsections of a given domain.

Further details of the pre-training of the word embedding model is shown in FIG. 5, and described in further detail below.

At Stage 2, having pre-trained the image feature extractor 306 and the word vectorization component 308, the item classifier 318 and embedding layers 312 are trained together, using a classification loss function defined on the output of the image classifier 318, and a training set of item records containing both images and text. For example, if the aim is to classify items according to category or occasion, each item record in the training set would be annotated with a category or occasion ground truth, and the loss function would penalize deviations in the output of the item classifier 318 from the classification ground truths. The text and image data of each item record of the training set are processed by the pre-trained word vectorization component 308 and pre-trained image feature extractor 308 respectively, to provide text and image features to the embedding layers 312. These are processed to provide an item embedding for each item embedding. The training of Stage 2 involves not only updating the weights/parameters of the image classifier 318, but also the weights/parameters of the embedding layers 312. Hence, in Stage 2, as the item classifier 318 learns to perform the desired image classification task, the embedding layers simultaneously learn to extract higher-level and domain-specific (e.g. fashion-specific) features, from the lower level text and image features, that enable that classification task to be carried out effectively. The parameters of the image feature extractor 306 and the word vectorization component 308 are frozen (remain unchanged) in Stage 2.

The classification task learned at Stage 2 is domain-specific. For example, category and occasion classification are two examples of fashion-specific classification tasks. This, in turn, encourages the embedding layers 312 to look for domain-specific features/patterns in the lower-level text and image features (the domain-specific nature of the lower-level text features also help in this respect). Although remaining domain-specific to classify a given object, different domain-specific classifications may overlap in the actual classifications. For example, the fashion-specific classification may include category (such as pants, jeans, shirts, etc.) and occasion (such as eveningwear, casual, etc.), while a music-specific classification may also include a category (such as hip hop, country, classical, etc.) and occasion (such as work, spa, study, sleep, etc.). Although the classifications may overlap, the applications may be domain-specific.

The knowledge gained through exemplary embodiments of the present system may therefore be deep, and not superficial. For example, where other models might analyze images at the level of "red dress", the trained system herein might learn overarching aesthetic features from the combination of text and images at the level of red+dress+A-line silhouette+brand+material+scalloped trim+maxi length+ pearl buttons. Exemplary features may be identified, for example, collar or neck type, textures, sleeve lengths, cuts, fitting, trims, lace, etc. These features do not need to be pre-defined. In exemplary embodiments, the embedding layers 312 learn suitable features autonomously during the training on the domain-specific (e.g. fashion-specific) classification task; however, the way that task is constructed within the architecture of the ML pipeline 122 means the models gain a far deeper insight into specific features relevant to the domain under consideration (e.g. fashion) work together in combination.

Further details of the training of the item classifier 318 and embedding layers 312 are shown in FIG. 6 and described below.

The description feature extractor 309 may or may not be trainable. For example, where tf-idf is used to weight word embeddings, this would not necessarily require any additional training. In the case that this is a trainable component (e.g. an RNN), it can be trained at Stage 2 in conjunction with the embedding layers 312 and the item classifier 318, or it could be pre-trained in a preceding stage.

At Stage 3, the item-scoring component 604 is trained. As noted, the item scoring component 604 uses the same item embedding output of the embedding layers 312 as the image classifier 318 (encoding both text and image information). This means that the item scoring component 318 is able to leverage the domain-specific knowledge learned in the domain-specific classification training of Stage 2. This knowledge is encoded in the parameters of the embedding layers 312, which may be frozen in Stage 3. In Stage 3, the ground truth is ground-truth personality codes assigned to items e.g. through manual annotation.

Further details of the training of the item-scoring component 318 are shown in FIG. 4, and described below.

A benefit of this three-stage approach is that the training-data requirements at each stage are reduced. A large volume of image training data would typically be needed to train the image feature extractor 306 to state-of-the-art performance, but as noted this can be achieved with a generic image training set, deferring the domain-specific learning to Stages 2 and 3.

For the word-vectorization component 308, as described below, the training is unsupervised in the sense that training documents (item descriptions) do not need to be annotated. The only manual expertise that is needed is to define the domain-specific vocabulary and curate (but not necessarily annotate) the training set.

Stage 2 can also be implemented fairly effectively with a relatively small amount of training data, because it is not starting "from scratch". The embedding layers 312 have the benefit of the "generic", but nonetheless relevant, knowledge of the image feature extractor 306, plus the benefit of the domain-specific knowledge of the word vectorization component 308. Moreover, there is also the potential for the classification ground truth (e.g. ground-truth categories, occasions etc.) to be derived automatically or semi-automatically from the item description TXT of the training data, in the event that data is available.

In an exemplary embodiment, Stage 3 requires the smallest amount of training data, and staging it in this manner is a preferred choice. Annotating item records with e.g. category, occasion, or whatever domain-specific categories are used is a simpler tasks than assigning personality scores; whereas the latter needs some degree of expert knowledge in both fashion and psychology, the former only requires knowledge of fashion (or whatever domain is under consideration) and is, in that sense, a "lower skill" task.

In an exemplary embodiment, the system is configured to receive product feeds from one or more sources. The product feeds may include, for example, product inventory from a supplier and may include data such as the item image, item description, etc. The feed is then provided to exemplary embodiments of the system to be analyzed, categorized, and assigned an item PSV.

In an exemplary embodiment, item classifier 318 is not a "dummy classifier" whose only purpose is to facilitate the training of the embedding layers 312; rather, as described above with reference to FIG. 1, both the classifier 318 and the item scoring component 604 serve functions in the system. Once they have been trained, they may be used to tag and score new items as they arrive in the system, and those tags and scores may then be used to provide a set of highly effective and engaging user interface features for navigating and customizing item recommendations, as will now be described.

Item Recommendations—Overview

FIG. 3C shows further details as to how the item scoring and classification components 604, 318 are deployed in the system of FIG. 1.

As indicated above, the recommendation engine 112 matches item PSVs with user PSVs, in order to provide an ordered list of recommended items 310 to each user. For example, an approximate-nearest-neighbor (ANN) method or other a distance-based algorithm may be used, which takes a user's PSV as input, and performs a search over item PSVs to locate a number of item PSVs within a certain distance of the user's PSV in trait space. The ANN method finds the nearest neighboring item PSV, i.e. the item PSV closest to the user PSV in trait space, and returns all items within a predetermined multiple of the nearest neighbor distance. That is, denoting the distance in trait space between the user's PSV and the closest item PSV as d, ANN return all items within a distance cd ("horizon") of the user's PSV. In an exemplary embodiment, the size of the horizon is variable in dependence on the distanced to the closest item. Hence, the horizon may be adjusted to expand the search as needed. ANNs are reasonably fast and scale very well so anything that can be represented with a vector—in this case, vectors representing items in trait space—can be retrieved quite fast by relevance (according to a defined metric).

The recommendation engine 122 may sort items according to the match distance and present the user with a set of closest-matching recommended items 320, ordered according to distance in trait space. The set of recommended items may be presented with links to redirect the user to the relevant external platform that provides the items, in the manner described above with reference to FIG. 2.

One purpose of the tag(s) 126 is to allow the list of item recommendations 320 to be searched according to the domain-specific classes under consideration. For example, with "occasion" classification, suitable classes (tags) might be "everyday", "evening", "holiday", and "business", and options are provided to search the recommendations 320 according to those classes (as in the example of FIG. 7A below). This functionality is represented by a search component 322 in FIG. 3C.

Interactive Features

The interactive features 117 allow the user to tweak their recommendations. Autonomously-derived PSVs are still used as a basis for the recommendations, but the user is given some freedom within the trait-based framework. Exemplary embodiments of this feature may permit user-awareness and transparency. Users may be given insights to the psychological foundations of the matching. A user who has taken the psychometric test may already have some understanding of the psychometrics underpinning the recommendations. Further insights can be provided, for example, by providing a user with his or own PSV, or by displaying PSVs of items.

Alternatively, or additionally, insights into the underlying psychology can be presented in a way that is easy for a non-expert user to understand, such as intuitive "browse by mood" categories (further details below).

FIG. 7A schematically illustrates an example graphical user interface (GUI) for displaying, navigating and engaging with recommended items. Six item representations 700a-f are depicted by way of example. There is a visual representation of items recommended to a user based on their PSV, ordered based on distance in trait space, and are selectable via the GUI to access details about the item from the corresponding item record in the item database 108 and/or to redirect the user to the external platform to allow the user to obtain the item therefrom.

Various selectable options 702 are provided to allow the user to easily navigate the recommendations, e.g. based on brand, color, price range etc. In an exemplary embodiment, the starting point is the ordered list of items recommended based on personality traits. These additional options allow the user to navigate those tailored recommendations more easily. Additionally, the following options are also provided.

Browse by Mood

With the browse by mood feature, a user is presented with intuitive options such as "I want to feel . . . " [happy, adventurous, romantic, confident, calm etc.], whereby the system 100 tweaks the user's personality code to alter the recommendations received. Say for example, a particular user is assigned a PSV of (O4 C3 E4 A2 N4) based on their test responses—that is someone with moderate-high Neuroticism (N4), who is prone to worrying. If they select the option that they would like to feel happier, the recommender 112 would return results for an N3 person, e.g. (O4 C3 E4 A2 N3), which would likely be brighter in color and less severe in aesthetic. As another example, if the user were job-hunting and wanted to feel more "determined", i.e. conscientious or dutiful, it would return results with higher C, e.g. results matching the personality codes (O4 C4 E4 A2 N4), which would be items that embody that trait in the physical aesthetic sense, such as tailored items, blazers, and other items associated with professional achievement, and hence the conscientiousness trait. The user's own personality scores remain at the core of the results, but can be tweaked to provide more varied recommendations which different moods dictate, yet that still largely reflect the user's own specific personality traits. In this case, the user's own personality scores may be used to determine the matching, but may be offset higher or lower from the user's specific personality trait to account for the objective of the user, to encourage a mood or project an attribute. The amount of an offset may be based on user input, such as how much deviation they are interested in, or for the occasion. For example, a deviation of one number may be used for mood modification, but a deviation of two numbers may be used to achieve a result in others, such as in projecting a specific attitude. In an embodiment, results might also be altered using a criteria of the object that may be saved as a tag, keyword, or label. For example, a subset of colors could be used to influence mood, and therefore the results may be filtered based on the correlations between mood and color.

FIG. 7A shows a selectable browse by mood drop-down menu 702a, with options for tweaking the recommendations according to mood. Selecting one of these options would cause a new list of recommendations to be displayed, which are located based on proximity in trait space to the user's PSV that is either offset for comparison and/or filtered according to embodiments described herein.

This provides a way to incorporate mood within the structured recommendation framework. Personality is stable hence reflects baseline results, but mood is fluid so working in this feature provides a more accurate snapshot of the user's psychology (personality+mood) at the given time, hence more accurate results (without detracting from the long-term stability that stems from the use of personality traits).

The system can capture a user's unique mood fluctuation pattern over time and be able to anticipate mood, e.g. it might recognize that a user is particularly happy and excited around her birthday or in summer, and thus show her brighter, happier options to divert from her baseline higher neuroticism. That is, inferences may be made autonomously about the user's mood, without the user having to explicitly indicate a current mood.

Browse by mood is provided as an exemplary option for dynamic adjustment of the comparison to the user's PSV. Other basis for dynamic adjustment that results in a modified comparison to a user's PSV while making an association or comparison to an object is also within the scope of the present disclosure. The user may seek to alter a current mood that may impose an adjustment on the user's and/or object's PSV to generate a modified PSV for comparison. The user may also seek to alter an environment, such as to encourage concentration that may impose an adjustment on the user's and/or object's PSV to generate a modified PSV for comparison. The user may also seek to elicit a response in others, such as to project a characteristic within the user that may impose an adjustment on the user's and/or object's PSV to generate a modified PSV for comparison. The user may also wish to create an environment that is more acceptable to a group such that the imposed adjustment may move a user's PSV toward a standard or average PSV of an identified group. Because embodiments of the present disclosure may be used for visual items, audio items, other sensory items, or any object category, the dynamic adjustments may be in relation to any of these areas. The dynamic adjust may be in an offset to one or more of the PSVs being compared. The dynamic adjust may be achieved through filtering before and/or after the comparison on an unmodified PSV for the user and object. The dynamic adjustment may occur in real time so that a user's PSV is stored in an unmodified condition.

Exemplary embodiments may include a user interface that classifies the objective in a user-friendly, non-technical way so that the user does not need to make an association based on the underlying PSV traits. For the mood example, the user may simply select a mood they wish to encourage within themselves. The system may thereafter impose the adjustment on the user's PSV to generate the modified PSV in relation to the selected mood. The user may similarly select other attributes, such as an occasion. The user may be attending a wedding, or going on a job interview, or showing a presentation, in which the user may desire to embody a particular personal quality, feel a certain way, and project a specific image. The system may present and permit the user to select an objective or may automatically associate attributes with the objective. For example, if the user selects a category of "job interview", the system may present the user with qualities the user may wish to embody, like reliable, detailed, friendly, assertive, etc. The system may alternatively pre-select qualities associated with the category. In either case, the system may thereafter adjust one or more PSVs to generate the modified PSV in relation to the user's selections for comparison and/or filtering. The user may therefore not be aware which psychological traits the user is modifying based on their selections.

Browse by Category/Occasion Etc.

The user may filter and search recommended items by category and/or occasion, where these have been tagged by the trained classification component 604. The user may provide the UI with one or more categories or occasions of interest, and the recommendation engine may use these to filter the list of recommended items by their tags determined by the item classifier 604.

By way of example, an occasion drop-down menu 206b is shown with options to filter by "everyday", "evening", "holiday" and "business". This would filter the existing list of recommendations according to the user's selected category/occasion etc.

Exemplary embodiments of the tag may also be used in relation with the dynamic adjustment of the user's PSV. For example, if a user selects "business", the system may then filter the presented items based on the "business" tag, but may also dynamically adjust the comparison against the user's PSV to generate a modified PSV according to embodiments described herein to account for a desired projection of attributes of the user to others in the work environment. Similarly, if the user chooses "chill" or "workout" as an occasion, the system may modify the PSV criteria for comparison to provide a mood correlation, such as calm, or happy that is normally associated with the selected tag. The modified PSV criteria can be a dynamic adjust to the PSV for use in the comparison, may be an offset added at the time of the comparison so that the PSV of the user and/or object is unchanged, and/or may be in a filtering before and/or after a PSV comparison has occurred. For example, the system may compare a PSV and make a recommendation based on PSV values in common within a predetermined range. The recommendation may then be filtered such that object's within a PSV within a subset of the original recommendation may be selected based on the desired characteristics. Alternatively, or in addition thereto, the PSV of one side of the comparison (user and/or object) may be offset with an offset value for the comparison, wherein the offset value is determined based on criteria associated with the desired modification. The user's and/or object's PSV may therefore remain status, while the comparison for recommendations is based on a modified PSV.

Per-Item Modification:

Presented with a list of recommendations (or ordered set of item records more generally), a user has the option to suppress individual recommendations they do not like, and encourage/incite recommendations that they particularly like. These options may be presented alongside each recommended item as an 'X' button, which a user selects to suppress similar recommendations and a 'tick' which a user can select to encourage or incite similar recommendations ("like").

If an item is suppressed, that item is moved from its position in the list of recommendations and another recommended item is presented to the user. The user action to suppress a recommendation may trigger a signal to the AI system, which may periodically update the user recommendation ranking in response to the user's preferences.

Similarly, if an item is encouraged, this may trigger the AI to re-evaluate the ranking of recommended items taking this preference into account.

Figure 7B:
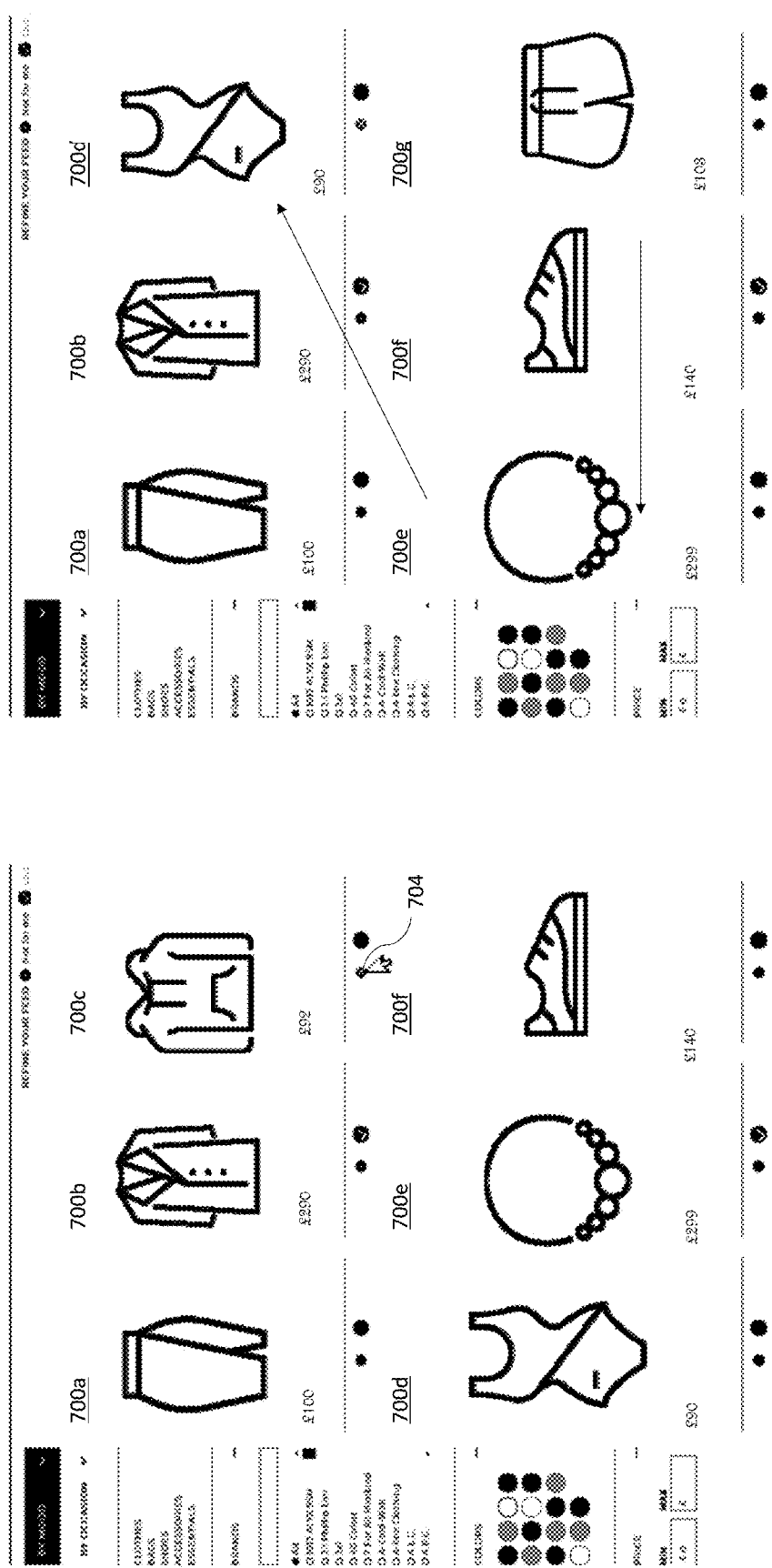

FIG. 7B shows an example where a user selects dislike option 704 to suppress item 700c. In response, the visualization is removed from the list, with the consequence that each of the recommendations after this moves up the list, bringing item record 700g into view.

Information about items the user has suppressed, liked, or otherwise engaged with, may be stored as part of their profile 120, and can be used to influence future recommendations, in conjunction with their psychological traits. This individual user feedback model is one way to account for non-psychological "influence" (such as age, subculture, where the user grew up, etc.) which may cause a degree of variation in the preferences of users with similar personality traits. The combined effect is to facilitate recommendations according to personality, mood, and other influence.

Figure 8:
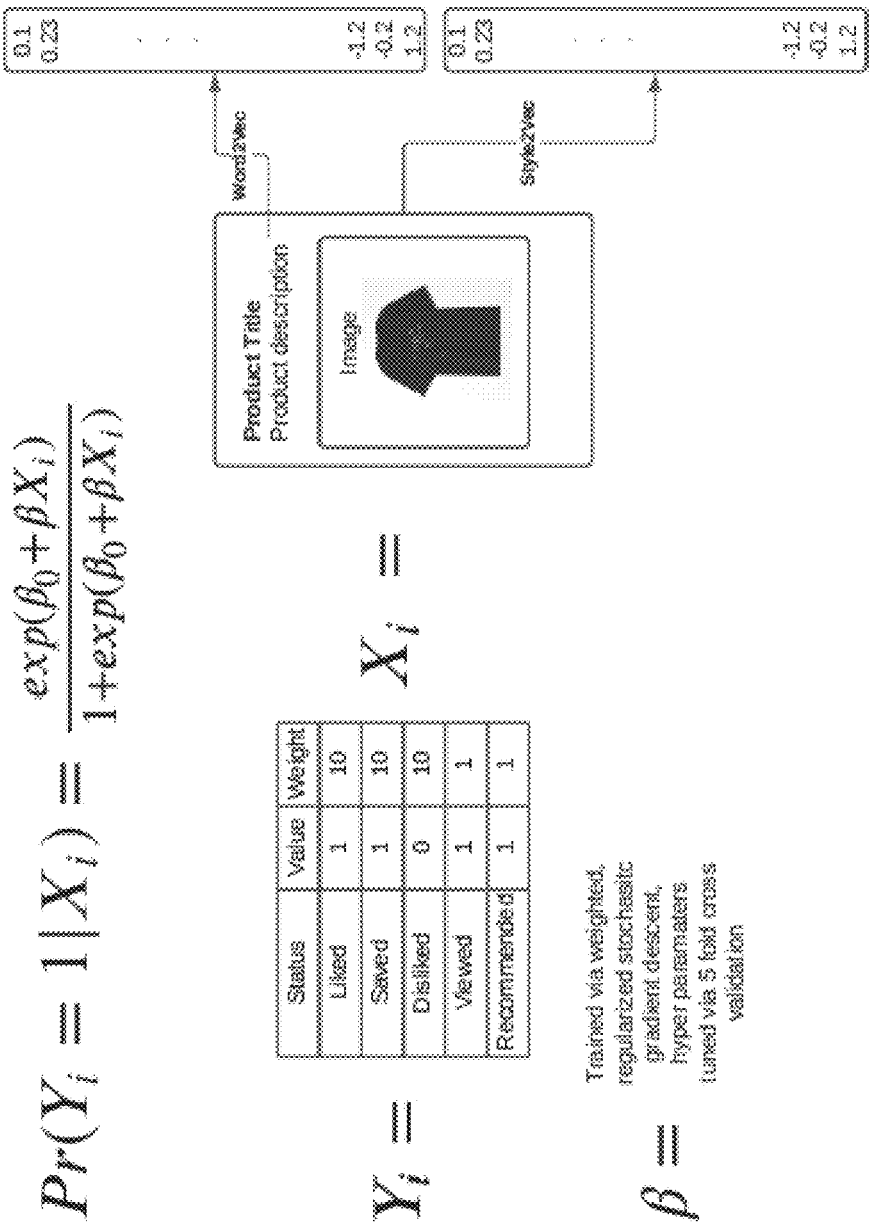
FIG. 8 illustrates an exemplary analytical representation of an exemplary user feedback model according to embodiments described herein.

FIG. 8 illustrates an exemplary analytical representation of an exemplary user feedback model according to embodiments described herein. As illustrated, the system may receive data about an object. The data may be in an information feed, such as from an inventory feed, or may be through one or more other sources, such as a database, or data entered by a user. The illustrated representative data about an object includes the product title, a textual description of the object, and an image of the object. According to embodiments described herein, the image and text may be analyzed. For example, the image may be an input to the image feature extractor to produce a feature representation is then produced, and the product description may be used as an input to the word vectorization component to produce a representative word vector. As illustrated, the product vectorization is represented as Xi. The system may also be configured to permit the user to like, save, dislike, view, and/or recommend an item. Each selection may include a tag or indicator that can be saved or associated with the item. Items may therefore include a status. The status may include one or more of the options. For example, a user may save an item and recommend it to others. Each status may have a corresponding value and/or weight. The value, weight combination may be used in determining a personalization offset which may be used to dynamically adjust PSV such as in the comparison between object and user PSV.

In an exemplary embodiment, the object's PSV may be updated, modified, or changed based on one or more user feedback criteria. For example, if an item is repeatedly dislike by a user that is analytically assessed to correspond to a given PSV value, the object's PSV value may be modified. An item PSV may therefore be changed if a statistically significant amount of people with a corresponding PSV have liked or unliked it, in contrast to the system's previously stored learned associations, thereby creating a new association. As a specific example, if a handbag of a certain style, shape, and print was previously tagged with a PSV of 45432, but users with a corresponding PSV generally dislike the object or users with a PSV of 45434 generally like the object, then the PSV associated with an object of similarly recognized traits may be updated, modified, or reassigned the 45434 PSV.

In an exemplary embodiment, system may comprise a binary classifier for each user that may be regularized logistic regressions. Training data may be used and made up of explicit feedback. For example, an explicit feedback may include an active user input, such as a like or dislike or recommendation action. The training data may be used and made up of implicit feedback. For example, an implicit feedback may include an inaction of a user, such as when a user has received a recommendation but did not act on it). The training data may include both explicit feedback and/or implicit feedback from one or more users. Exemplary features may be bade up of style2vec data (embeddings of image and text descriptions) and wod2vec data (embeddings of text descriptions only) as described herein. During model training, explicit feedback may be weighted more heavily than implicit feedback. Exemplary embodiments, may, however, include more data on implicit feedback. Therefore, the model may perform a supervised anomaly detection to predict which products a user may dislike, where the control data may be the set of implicitly rated products. The model may be trained using grid search cross validation, or a model chosen to maximize ROC AUC.

Item-Scoring Training:

FIG. 4 shows a schematic diagram of the training of the item-scoring component 318 to assign meaningful PSVs 118 to items based on their combined feature vectors. The item-scoring component 318 is trained using PSV ground truths assigned to training items.

The ground truth PSVs 402 may be determined, at least in part, by expert manual annotation by one or more annotators that are familiar with the item domain and the trait dimensions and who have learned associations between aesthetic features and personality traits based on observed evidence.

In the present example, the feature extractor 305 is pre-trained separately (see below) with the item classification component 604, and the parameters of the feature extractor 305 are frozen during training of the item-scoring component 318.

For each item of a training set, to which a ground truth PSV 402 has been assigned, the item-scoring component 318 uses these model parameters to calculate a PSV 118a from a combined item feature vector 316a provided by the pre-trained feature extractor 305. This calculation may be carried out by a set of support vector machines (SVM) configured to classify input items in relation to a set of classes. The item score prediction 118a is input to a scoring loss function 404, along with the ground-truth score vector 402 associated with the training item. The scoring loss function 404 calculates some measure of difference between the ground truth vector 402 and the item score prediction 118a. The parameters of the model are updated so as to minimize the loss function 404 over a large number of training instances. This may be achieved using gradient descent methods.

A viable way to train the item scoring component 318 would be to create a sufficiently large training set of training data, of example items annotated by a person or people with suitable expertise. Typically, results can only be achieved if that person(s) has some level of expertise in both psychology and the item domain itself (such as fashion), or has been trained/guided by an expert in both of those fields.

As an alternative to, or in conjunction with some level of manual annotation or review, once a sufficiently large population of users have taken personality tests, that information can potentially be used to infer correlations between sensory attributes (such as visual appearance) and aesthetic data, and personality. For example, if a statistically significant number of users with similar personality traits are observed to express some level of consistent preference or dislike for items with particular sensory, descriptive, or aesthetic features, that information could be used as a basis for (or to assist in) the process of scoring items against personality traits.

Word Embedding Pre-Training:

FIG. 5 shows a highly schematic block diagram of the training of the word vectorization component 308. The component is trained on a corpus 500 of domain-specific language. In one example, this may be fashion-related text, wherein the items to be recommended are fashion items. The text comprises natural language data in its context within domain text rather than an abstract collection of words or phrases. The text is tokenized to obtain a set of unique words within the text, where the size of this set is known as the vocabulary V. Each unique word in the vocabulary may be mapped to a sparse vector according to a 'one-hot' encoding scheme by indexing the words and representing each word as a vector of length V by placing a 1 in the position of that word's index. For example, if there are 10,000 words in the vocabulary, and 'coat' is indexed as number 450, the corresponding one-hot vector for 'coat' would be a vector of length 10,000 with a 1 at position 450, and with every other element being 0.

The training is unsupervised, in the sense that ground truth is contextual information derived from the content and structure of the training texts themselves, rather than manual annotation. This can, for example, be based around the known "Word2Vec" algorithm. Each word 502 in the corpus of K words is then processed in the form of a one-hot encoded vector 504. The word embedding layer 506 is trained to learn vector representations 508 of a predetermined size that use the context of the word as it appears in natural language. The word embedding layer may take the form of a V×M matrix, where M is the predetermined vector size. Context here refers to a set of neighboring words of a given size, referred to as a context window. For example, if the context window is 2, the context to be predicted will include the two words immediately preceding and following the word being processed as it appears in the corpus text.

In a skip-gram model, the goal of training is to accurately predict the set of context words for the given word and context size. This is achieved by a classification layer 510 predicting the set of context words for each training input word 502. The classification layer 510 takes as input the dense word representation vector 508 and outputs a prediction 512 of the context of that word in the form of a one-hot encoded vector. The classification layer 510 may take the form of an M×V matrix, where M is the predefined size of the dense representation vector 508 and V is the vocabulary size. The context prediction 512 may be determined using a softmax function, which outputs a probability value for each word in the vocabulary representing the probability that each word lies within the context window of the input word.

A loss function 514 is used to compare the predictions of the model with the real context of the input word in the training corpus. The loss function may comprise computing a log likelihood function which gives the log probability of the real context 516 within the training corpus given the model-predicted probabilities 512. The loss function may be the negative of the log likelihood of the observed context vectors. The goal of training the model is to adjust the parameters so as to maximize the likelihood of the observed data given the model. The parameters of the word embedding 506 and classification layers 510 are thus updated to minimize the loss function 514. This may be achieved using gradient descent methods. The parameters of the word embedding layer 506 are trained in this way to learn a representation that encodes the context of the word 502 as used within the text domain of interest. After training, only the embedding layer is required to produce a dense word vector suitable for other tasks. The classification layer 510, which predicts word context, is not used outside of training as word context prediction is a 'dummy task' used solely to learn an appropriate word representation. As will be appreciated, this is merely one illustrative example of a suitable training loss and method, and the subject matter is not limited in this respect.

While this considers neural network vectorization, other forms of models can be used. For example, an alternative implementation could use a topic-model here to derive a description embedding. It is expected that certain non-neural network models might perform better with topics.

Image Feature Extraction—Pre-Training:

The image feature extractor 306 is pre-trained on a suitable image classification task. In the case of fashion items, this could for example mean classifying images, and associated text descriptions, based on PSV, product type category or occasion.

FIG. 6 shows a highly schematic block diagram of the training of the embedding layers 312 and the item classifier 604 to carry out one or more domain-specific image classification tasks. In one example, the items 106 are clothing items within the fashion domain, and the aforementioned components are trained on the goal of classifying the classes 610 (for example, category and occasion) of the item given the visual image 600 of the item. Training item records each comprising both image(s) 600 and description text 602 are tagged with their known classes 610, in this example product category (e.g. tops, shoes, etc.) and occasion (e.g. workout, business, evening, etc.). This is not limiting, and other classes may be used to train the feature extractor, such as style, etc. The classes may be associated or defined based on the given object domain, such as fashion, furniture, etc. The feature extractor 306 takes as input the training image 600, and outputs a feature representation 602 of the image. The feature representation may be in the form of an array or 'feature map' or other higher-rank tensor derived though convolution (using a CNN architecture), or this could be converted to a feature vector via one or more fully-connected layers. Likewise, the pre-trained word vectorization component 308 and document feature extractor 309 cooperate to extract description features 603 from the text 601. The image and description features 602, 603 are both provided to the embedding layers 312, to provide a single item embedding 316*a* for each item record of the training set, which in turn is provided to the item classifier 604.

The classification component 604 may, for example, take the form of one or more neural network classification layer(s) 604, and may for example comprise a fully-connected layer, which applies the network parameters to the feature representation 602 to obtain an output vector with respect to the relevant classes of category and occasion. A softmax function may be applied to obtain a probability distribution over all possible categories and occasions.

An item classification loss function 612 compares the predictions 606 output by the classification layer 604 with the ground truth classes 610. The loss function 612 may be a cross entropy between the actual and predicted probability distributions over all possible classes. The parameters of both the classification component 604 and feature extraction component 306 may be updated so as to minimize the loss function 612. This parameter update may be done using a form of gradient descent. In this way, the embedding layers 312 are trained to extract features from both the input training image 600 and input training text 601 that are helpful in classifying the item in the image by the defined classes, thus yielding a representative embedding 416*a* for the item.

In an exemplary embodiment, the system does not have to be exclusively visual, but can be extended to incorporate other aesthetic considerations. For example, an important factor in some instances may be a particular material type, such as velvet, which can invoke a tactile response. Exemplary embodiments described herein may use the term aesthetics in a broad sense and includes "sensory-emotional". For example, certain classes of item can also invoke emotional responses, which may be a relevant factor. Aesthetic data may therefore be used herein to describe sensory information and/or emotional information associated with an object. In the context of a digital platform, at least to some extent, this information may be gleaned visually in any event and measured by interactions.

Personalized Offset Function—Training:

In an exemplary embodiment, the system may include a personalization component that can dynamically adjust PSV to form the basis of comparison. The system may also dynamically or periodically update an object's PSV. The system may thereafter track the object's dynamically adjusted PSV for future comparison and/or may periodically update the object's dynamically adjusted PSV in accordance with embodiments described herein. In an exemplary embodiment, the adjustment may be based upon input from a user. The coefficient to offset an object's PSV may be trained via weighted, regularized stochastic gradient descent, hyper parameters tune to the corresponding to the vectors of the object's PSV. For example, if the conventional five category OCEAN standard is used, then the parameters may be tuned based on the five OCEAN parameters.

As illustrated, a user may provide feedback to the system with respect to any given product. The illustrated feedback may be whether the user saves the item (or purchases the item), whether the item is indicated as like, whether the item is indicated as disliked, whether the item is viewed, and/or whether the item is recommended to others. Each parameter of the feedback may include a value and a weight. The user feedback may thereafter be used in a weighted offset function to dynamically adjust an object's PSV across the different OCEAN parameters. In this way, the system may continue to learn and/or update if the system detects that a correlation between an object and a user was improperly made in the original or subsequent training and/or input. For example, if an item is repeatedly dislike by a group of users that are analytically assessed to correspond to a given PSV value, the object's PSV value may be modified. An item PSV may therefore be changed if a statistically significant amount of people with a corresponding PSV have liked or unliked it, in contrast to the system's previously stored learned associations, thereby creating a new association. As a specific example, if a handbag of a certain style, shape, and print was previously tagged with a PSV of 45432, but users with a corresponding PSV generally dislike the object or users with a PSV of 45434 generally like the object, then the PSV associated with an object of similarly recognized traits may be updated, modified, or reassigned the 45434 PSV.

Extensions

While the above primarily considers visual and aesthetic preference information in a fashion context in particular, the teaching can be applied more generally to any sensorial preference. Wider aesthetic properties could include one or more of visual, musical/auditory, tactile, odor, scent, taste (as in flavor), gustatory, or, textual stimuli. All of the description above pertaining to visual preference applies equally to other forms of aesthetic preference. That is, the same framework can be used to match users with suitable items by scoring items in the above manner based on any aesthetic properties of the items. Items may be physical or digital, with digital items including, for example, content items, such as items of video or music streaming content on streaming platforms and other digital media platforms.

Reference is made above to various components and the like, including the components of ML pipeline 122 and the other components of the system 100 depicted in FIG. 1. These are functional component which may be implemented, at the hardware level, in a variety of computing platforms. For example, a computer system may comprise one or more hardware processors, e.g. general-purpose programmable processors, such as CPUs, GPUs/accelerators etc., where the functionality of the aforementioned components carried out according to instructions executed on the underlying processor hardware of the computer system. References to databases and the like refer to organized data storage but otherwise do not imply any particular physical or logical structure. At the hardware level, a database, such as the user and item databased 104, 106 in FIG. 1, can be implemented in a localized or distributed fashion using one or more physical storage devices (such as magnetic, optical, or solid-state storage etc.).

Exemplary embodiments described herein may be used to provide a distributed item management system. In this context, the system may be configured to retrieve data, such as the item data from external platforms, systems, databases, or other locations. However, applications of the instant description are not so limited. For example, a single system may take advantage of embodiments described herein for assigning PSVs to objects in order to make an association between users and/or other objects. The system may therefore directly include the database of items and item data. The system may therefore already have a dataset that does not require pre-processing as the dataset may already be standardized. The system may therefore not include information or links to send users outside of the system to purchase objects. Instead, these features may be directly incorporated into the system. The system may therefore permit users to purchase selected items, and/or play selected items (such as in the event of audio or video files).

In embodiments of the above-mentioned first aspect, the computer system may comprise a feature extractor configured to process at least one of: aesthetic data of each item to extract at least part of the aesthetic information in the form of an aesthetic feature set for use by the item-scoring component, and a description of each item to extract at least part of the aesthetic information in the form of a description feature set for use by the item-scoring component. Exemplary embodiments of the aesthetic data may be sensory data, emotional data, or combinations thereof. In the event of sensory data that includes visual attributes (images or videos) at least part of the visual appearance information in the form of a description feature set for use by the item-scoring component may be extracted from the description and/or from extraction of the image data. For other aesthetic data, the corresponding relation to the aesthetic feature (whether sensory and/or emotion) may be extracted (at least partially) from the description of each item or from other data (such as visual image, product description, etc.) For example, exemplary sensory data set may comprise image data of each item that is extracted, at least in part, from the visual appearance information from an image data and/or from the visual description of the item contained in a description of the item. The extracted sensory data set may be in the form of an image feature set (or other aesthetic, sensory, or emotional feature set) for use by the item-scoring component.

For example, the feature extractor may be configured to extract both the image feature set from the image data of each item and the description feature set from the description of each item.

For example, the feature extractor may be configured to extract both the audio feature set from the audio data of each item and the description feature set from the description of each item.

The feature extractor may comprise an embedding component configured to process the image and description feature sets to compute a combined feature set, and the item-scoring component may be configured to use the combined feature set to assign the item the corresponding psychological test scores.

The embedding component may have been trained on an item classification task.

The computer system may comprise a score modification component configured to modify at least one test score of a user's set of psychological test scores, wherein the matching component may be configured to use the modified set of psychological test scores to provide an updated matching output to that user.

The score modification component may be configured to modify the at least one test score in response to a mood selection input from the user.

The computer system may comprise an item classification component configured to use visual appearance information of each item to classify the item in relation to a set of item classes. The computer system may have an input configured to receive an indication of at least one preferred item class and may be configured to use the at least one preferred item class to modify the matching output and/or the updated matching output based on the item classifications.

The computer system may be configured to generate user interface data for rendering a user interface configured to receive, from the user, the mood selection input for modifying the at least one test score and the indication of the at least one preferred item class.

The visual information used to classify the item may be extracted from one of image data and a description of each the item, or from a combination of the image data and the description.

The item classification component may be configured to use the same combined feature set to classify the item as used by the item-scoring component to score that item.

The embedding component and the item classification component may have been trained simultaneously on the task of classifying the items in relation to the set of item classes.

The item classification task and/or the item classes may be specific to a domain of the items.

The items may be clothing fashion items, furniture, makeup, travel destinations or other experiences, and the image classes may relate to one or more of: product type, product category, occasion, mood-relevance, travel-location relevance, and overarching style type.

The item classifier may have been trained using item class ground truth derived from a description or metadata of the item, the item image data and description or metadata contained in an item record.

The computer system may be configured to filter the matching output based on the at least one preferred item class.

The computer system may comprise a test delivery component configured to cause a structured series of questions to be outputted, in accordance with the psychological test, to each user at a user interface, and receive the user data in the form of responses inputted by the user at the user interface, the user-scoring component configured to assign the psychological testing scores to the user based on his or her answers.

The psychological test may be an objective psychological test, each response being numerical or categorical, wherein the user-scoring component may be configured to apply rules-based scoring to each user's numerical or categorical responses to assign the psychological test score in accordance with the objective psychological test.

The feature extractor may comprise a word vectorization component configured to extract word embeddings from the description, the description feature set comprising or derived from the word embeddings, the word vectorization components having been trained on a training set of example item descriptions and a predefined vocabulary specific a domain of the items to be scored.

The computer system may comprise at least one item database configured to store item records of the aesthetic items. The item-scoring component may be configured to associate each of the item records in the at least one item database with its corresponding psychological test scores for use by the matching component, the matching output for accessing the item records of the set of items with which the user has been matched. The aesthetic items may be visual items.

The computer system may comprise a user database configured to store a profile of each user, the profile comprising the user's psychological test scores for use by the matching component, wherein the matching component may be configured to associate the user's profile with the item records of the set of items with which he or she has been matched.

The personality traits may comprise the Big Five personality traits.

The computer system may comprise an item suppression component, configured to receive from a user an indication of at least one item of the matching output to be suppressed, and to provide an updated matching output to that user without the suppressed item.

The computer system may be configured to store information about items the user has suppressed or otherwise engaged with in a profile of the user for use in generating future matching output for the user in conjunction with the user's psychological test scores.

A second aspect herein provides a computer-implemented of matching a user with visual items, the method comprising: receiving at a recommendation engine a set of psychological test scores that characterize the user in terms of standardized personality traits of a predefined psychological test; matching the user with a set of visual items, by matching the user's psychological test scores with corresponding set of psychological test scores associated with each visual item, the corresponding set of psychological test scores assigned using visual appearance information of the item and indicating expected user visual preference for the item in terms of said standardized personality traits of the psychological test; and providing a matching output indicating, to the user, the set of items with which he or she has been matched.

The set of visual items may be located by applying a distance-based search algorithm in a trait space in which the sets of personality scores are defined, with distance measured from the user's set of psychological test scores.

The distance-based search algorithm may be Approximate Nearest Neighbors (ANN).

The matching output may order the set of items in order of distance from the user's set of psychological test scores.

A third aspect herein provides a computer system for matching users with physical or digital items having aesthetic properties, the computer system comprising: a user-scoring component configured to receive user data about each of the users, and process the user data so as to assign the user a set of psychological test scores that characterize the user in terms of standardized personality traits of a predefined psychological test; an item-scoring component configured to use information about the aesthetic properties of each item to assign the item a corresponding set of psychological test scores indicating expected user aesthetic preference for the item in terms of said standardized personality traits of the psychological test; and a matching component configured to match each user with a set of the items, by matching the user's set of psychological test scores with the corresponding sets of psychological test scores of the items, and provide a matching output indicating, to the user, the set of items with which he or she has been matched.

Any embodiments of the first or second aspects may be implemented in embodiments of the third aspect, but to aesthetics more generally. That is, all teaching and disclosure herein pertaining to visual information applies equally to other aesthetic characteristics, unless otherwise indicated.

A fourth aspect herein provides a computer system for navigating item records held in an item database, the computer system comprising: an image feature extractor configured to extract a set of image features from image data of each item record; a description feature extractor configured to extract a set of description features from an item description of each item records; an item classifier configured classify each of the item records in relation to a set of item classes based on a combined feature set of the item record; an embedding component configured to processes the image features and the description features, in order to compute the combined feature set for classifying each item record, the item classifier and the embedding component having been trained simultaneously based on a classification loss function; an item scoring component having been trained, separately from and after the item classifier and the embedding component, based on a scoring loss function, to score each item record using the same combined feature set as used to classify the item record; and a rendering component configured to generate user interface data for rendering a user interface, the user interface having one or more options for navigating the item records held in the item database based on their classifications and their scores.

In embodiments, the scores may be psychological test scores indicating expected aesthetic preference for each item in terms of predefined personality traits.

The computer system may comprise a word vectorization component having been trained, on a vocabulary specific to a domain of the items, to extract word embeddings from each item description, the description features comprising or derived from the word embeddings.

A fifth aspect herein provides a computer implemented training method comprising: in a classification training stage, simultaneously training an item classifier and an embedding component so as to substantially optimize a classification loss function, the classification loss function applied to (i) a classification output of the item classifier for each example item record of a classification training set and (ii) an item class ground truth associated with the example item record, the classification output generated by the item classifier based on a combined feature set computed by the embedding component, wherein the embedding component computes the combined feature set from a combination of image features and description features extracted from image data and an item description of the item record respectively; and in a subsequent scoring training stage, training an item scoring component as to substantially optimize a scoring loss function, the scoring loss function applied to (i) a scoring output of the item scoring component for each item record of a scoring training set and (ii) an item score ground truth associated with the item record, the scoring output determined by the item scoring component based on a combined feature set computed for that item record by the trained embedding component.

In embodiments of the training method, the scoring outputs and scoring ground truths may score each item in terms of predefined personality traits, the scores indicating expected aesthetic preference for the items in terms of said personality traits.

The scoring training set may have fewer example item records than the classification training set.

A sixth aspect herein provides computer program comprising code stored on a non-transitory computer-readable medium and configured, when executed on one or more computers, to carry out the any of the above method steps and/or system functions.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. For example, exemplary embodiments describe a computer system that may include a test delivery component, user-scoring component, feature extractor, vectorization component, item classifier, item-scoring component, pre-processing component, item-suppression component, score-modification component, or other features. It is understood that embodiments may include any combination of these features. For example, a computer system may exclude the user scoring component and instead receive such information from an outside source and/or determine or approximate the user's score based on other information available to the system. Similarly, the pre-processing component may be removed, for example, if the items and/or users are all within the same platform and the information already standardized. Therefore, any of these features may be duplicated, separated, combined, integrated, removed, or otherwise combined and remain within the scope of the instant description. Embodiments are exemplary only, and provide an illustrative combination of features, but are not limited thereto.

In an exemplary embodiment, the system may alternatively entirely remove the user scoring component, and focus instead of item scoring and/or classification. In this case, the item scoring may not be used to match to an individual, but instead matched to other object and/or other criteria. For example, the system may use the item scoring to match objects to a target sensory-emotional target or to a target score criteria. For example, items may be scored and/or categorized. The items may thereafter be matched based on a target criterion. This target criteria may be based on a psychological trait or traits of a target group, or to achieve a desired emotional response.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

REFERENCES

Hereinabove, reference is made to the following, each of which is incorporated herein by reference in its entirety:
[1] Chamorro-Premuzic, T., Reimers, S., Hsu, A., Ahmetoglu, G. (2008) Who art thou? Personality predictors of artistic preferences in a large UK sample: The importance of openness. DOI: 10.1348/000712608X366867.
[2] Chamorro-Premuzic, T. (2007). BPS textbooks in psychology. Personality and individual differences. Blackwell Publishing.
[3] Chamorro-Premuzic, T., & Furnham, A. (2005). Personality and
intellectual competence. Lawrence Erlbaum Associates Publishers.
[4] Matthews, G., Deary, I. J., & Whiteman, M. C. (2003). Personality traits (2nd ed.). Cambridge University Press.
[5] Costa, P. T., Jr., McCrae, R. R., Zonderman, A. B., Barbano, H. E., Lebowitz, B., & Larson, D. M. (1986). Cross-sectional studies of personality in a national sample: IL Stability in neuroticism, extraversion, and openness. Psychology and Aging, 1(2), 144-149. DOI: 10.1037/0882-7974.1.2.144.
[6] Paunonen, S. V. (2003). Big Five factors of personality and replicated predictions of behavior. Journal of Personality and Social Psychology, 84(2), 411-424. DOI: 10.1037/0022-3514.84.2.411.

The invention claimed is:
1. A computer system for matching users with items, the computer system comprising: one or more hardware processors configured to implement:

a user-scoring component configured to receive user data about each of the users, and process the user data so as to assign the user a set of psychological test scores that characterize the user in terms of personality traits of a psychological test;

an item-scoring component configured to use information of each item to assign the item a corresponding set of psychological test scores indicating expected user preference for the item in terms of said personality traits of the psychological test;

a feature extractor configured to process both of: image data of each item to extract at least part of a visual appearance information in the form of an image feature set for use as information by the item-scoring component, and a textual description of each item to extract at least part of the visual appearance information in the form of a description feature set for use as information by the item-scoring component, wherein the feature extractor comprises a word vectorization component configured to extract word embeddings from the textual description, the description feature set comprising or derived from the word embeddings, the word vectorization components having been trained on a training set of example item descriptions and a predefined vocabulary specific a domain of the items to be scored, and a matching component configured to match each user with a set of the items, by matching the user's set of psychological test scores with the corresponding sets of psychological test scores of the items, and provide a matching output indicating, to the user, the set of items with the user has been matched.

2. The computer system of claim 1, wherein the feature extractor comprises an embedding component configured to process the image and description feature sets to compute a combined feature set, the item-scoring component configured to use the combined feature set to assign the item the corresponding psychological test scores.

3. The computer system of claim 2, wherein the embedding component has been trained on an item classification task specific to a domain of the items.

4. The computer system of claim 1, wherein the one or more hardware processors are configured to implement a score modification component configured to modify at least one test score of a user's set of psychological test scores, wherein the matching component is configured to use the modified set of psychological test scores to provide an updated matching output to that user.

5. The computer system of claim 4, wherein the score modification component is configured to modify the at least one test score in response to a mood selection input from the user.

6. The computer system of claim 1,
wherein the feature extractor comprises an embedding component configured to process the image and description feature sets to compute a combined feature set, the item scoring component configured to use the combined feature set to assign the item the corresponding psychological test scores; and wherein the item classification component is configured to use the same combined feature set to classify the item as used by the item-scoring component to score that item.

7. The computer system of claim 6, wherein the embedding component and the item classification component have been trained simultaneously on the task of classifying the items in relation to the set of item classes.

8. The computer system of claim 7, wherein the items are clothing fashion items and the item classes relate to one or more of: product type, product category, occasion, mood relevance, travel location-relevance, and style.

9. The computer system of claim 1, wherein the one or more hardware processors are configured to implement a test delivery component configured to cause a structured series of questions to be outputted, in accordance with the psychological test, to each user at a user interface, and receive the user data in the form of responses inputted by the user at the user interface, the user-scoring component configured to assign the psychological testing scores to the user based on his or her answers.

10. The computer system of claim 9, wherein the psychological test is an objective psychological test, each response being numerical or categorical, wherein the user-scoring component is configured to apply rules-based scoring to each user's numerical or categorical responses to assign the psychological test score in accordance with the objective psychological test.

11. The computer system of claim 1, wherein the personality traits comprise the Big Five personality traits.

12. The computer system of claim 1, wherein the one or more hardware processors are configured to implement an item suppression component, configured to receive from a user an indication of at least one item of the matching output to be suppressed, and to provide an updated matching output to that user without the suppressed item.

13. A computer program comprising code stored on a non-transitory computer-readable medium and configured, when executed on one or more hardware processors, to implement a method of matching a user with visual items:
receiving at a recommendation engine a set of psychological test scores that characterize the user in terms of standardized personality traits of a predefined psychological test;

assigning a visual item a corresponding set of psychological test scores using visual appearance information of the visual item indicating expected user visual preference for the visual item, wherein the visual appearance information of the visual item is extracted by a feature extractor that is configured to process both of:

image data associate with each visual to extract at least part of the visual appearance information in the form of an image feature set, and a textual description of each visual item to extract at least part of the visual appearance information in the form of a description feature set, and wherein the feature extractor comprises an embedding component configured to process the image and description feature sets to compute a combined feature set that is used to assign the visual item the corresponding set of psychological test scores;

classifying the visual item in relation to a set of item classes using the combined feature set;

matching the user with a set of visual items, by matching the user's psychological test scores with corresponding set of psychological test scores associated with each visual item, the corresponding set of psychological test scores assigned using visual appearance information of the item and indicating expected user visual preference for the item in terms of said standardized personality traits of the psychological test;

providing a matching output indicating, to the user, the set of items with which he or she has been matched, receiving a mood selection input for modifying at least one psychological test score of the set of psychological test scores or an indication of at least one preferred item class from the set of item classes; and providing an updated matching output to the user.

14. The computer program of claim 13, wherein the set of visual items are located by applying a distance-based search algorithm in a trait space in which the sets of personality scores are defined, with distance measured from the user's set of psychological test scores.

15. A computer system for matching users with physical or digital items having aesthetic properties, the computer system comprising:

one or more hardware processors configured to implement:

a user-scoring component configured to receive user data about each of the users, and process the user data so as to assign the user a set of psychological test scores that characterize the user in terms of standardized personality traits of a predefined psychological test;

an item-scoring component configured to use information about the aesthetic properties of each item to assign the item a corresponding set of psychological test scores indicating expected user aesthetic preference for the item in terms of said standardized personality traits of the psychological test;

a feature extractor configured to process both of: image data of each item to extract at least part of a visual appearance information in the form of an image feature set for use as information by the item-scoring component, and a textual description of each item to extract at last part of the visual appearance information in the form of a description feature set for use as information by the item-scoring component, wherein the feature extractor comprises a word vectorization component configured to extract word embeddings from the description, the description feature set comprising or derived from the word embeddings, the word vectorization components having been trained on a training set of example item descriptions and a predefined vocabulary specific to a domain of the items to be scored; and a matching component configured to match each user with a set of the items, by matching the user's set of psychological test scores with the corresponding sets of psychological test scores of the items, and provide a matching output indicating, to the user, the set of items with which he or she has been matched.

* * * * *